(12) United States Patent
Koyama et al.

(10) Patent No.: US 7,720,133 B2
(45) Date of Patent: May 18, 2010

(54) WIRELESS COMMUNICATION APPARATUS, WIRELESS COMMUNICATION METHOD, PROPAGATION MEASUREMENT APPARATUS AND PROPAGATION MEASUREMENT METHOD

(75) Inventors: Akihiro Koyama, Tokyo (JP); Akira Hayashi, Kanagawa (JP); Shinsuke Tashiro, Kanagawa (JP); Tsuyoshi Hashimoto, Kanagawa (JP); Masayuki Takada, Tokyo (JP); Katsumi Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1259 days.

(21) Appl. No.: 11/210,864

(22) Filed: Aug. 25, 2005

(65) Prior Publication Data

US 2006/0056375 A1    Mar. 16, 2006

(30) Foreign Application Priority Data

Sep. 14, 2004    (JP) .............................. 2004-266211

(51) Int. Cl.
*H04B 1/00* (2006.01)
*H04B 7/216* (2006.01)

(52) U.S. Cl. ........................ 375/147; 375/141; 370/342

(58) Field of Classification Search ................. 370/342, 370/320, 441; 375/134, 141, 144
See application file for complete search history.

(56) References Cited

U.S. PATENT DOCUMENTS

| 6,128,332 | A  * | 10/2000 | Fukawa et al. | 375/146 |
|---|---|---|---|---|
| 6,377,613 | B1 * | 4/2002 | Kawabe et al. | 375/142 |
| 6,556,617 | B1 * | 4/2003 | Tsujimoto | 375/141 |
| 2002/0110103 | A1 * | 8/2002 | Jung | 370/335 |
| 2005/0083998 | A1 * | 4/2005 | Li et al. | 375/148 |

* cited by examiner

*Primary Examiner*—George Eng
*Assistant Examiner*—Christopher M Brandt
(74) *Attorney, Agent, or Firm*—Oblon, Spivak, McClelland, Maier & Neustadt, L.L.P.

(57) ABSTRACT

Disclosed is a wireless communication apparatus for receiving a code-spread transmission signal. The wireless communication apparatus includes: an RF section; and a baseband section, wherein, in the baseband section, despreaders of an integral submultiple, which is $1/n_1$, of the number of chips of a spread code are arranged in parallel, and there is provided a propagation measurement section that measures a propagation channel by using the plurality of despreaders a plurality of times in a time-division manner and performing despread of each period corresponding to a chip rate of the spread code.

28 Claims, 23 Drawing Sheets

Accum Clear  Accum latch

Spreading Code A Chip x 8

FIG.21

| | | MEMORY ADDRESS | MEASURED-DATA MEMORY | | | | | | | |
|---|---|---|---|---|---|---|---|---|---|---|
| ONE SET OF MEASUREMENT | IN-CHIP PHASE 0/4 | 000 | I000 | Q000 | I001 | Q001 | I002 | Q002 | I003 | Q003 |
| | | 001 | I004 | Q004 | I005 | Q005 | I006 | Q006 | I007 | Q007 |
| | | 032 | I124 | Q124 | I125 | Q125 | I126 | Q126 | I127 | Q127 |
| | IN-CHIP PHASE 2/4 | 033 | I000 | Q000 | I001 | Q001 | I002 | Q002 | I003 | Q003 |
| | | 034 | I004 | Q004 | I005 | Q005 | I006 | Q006 | I007 | Q007 |
| | | 063 | I124 | Q124 | I125 | Q125 | I126 | Q126 | I127 | Q127 |
| ONE SET OF MEASUREMENT | | 064 | I000 | Q000 | I001 | Q001 | I002 | Q002 | I003 | Q003 |
| | | | I004 | Q004 | I005 | Q005 | I006 | Q006 | I007 | Q007 |
| | | | I124 | Q124 | I125 | Q125 | I126 | Q126 | I127 | Q127 |
| | | | I000 | Q000 | I001 | Q001 | I002 | Q002 | I003 | Q003 |
| | | | I004 | Q004 | I005 | Q005 | I006 | Q006 | I007 | Q007 |
| ONE SET OF MEASUREMENT | | 127 | I124 | Q124 | I125 | Q125 | I126 | Q126 | I127 | Q127 |
| | | 128 | I000 | Q000 | I001 | Q001 | I002 | Q002 | I003 | Q003 |
| | | | I004 | Q004 | I005 | Q005 | I006 | Q006 | I007 | Q007 |
| | | | I124 | Q124 | I125 | Q125 | I126 | Q126 | I127 | Q127 |
| | | | I000 | Q000 | I001 | Q001 | I002 | Q002 | I003 | Q003 |
| | | | I004 | Q004 | I005 | Q005 | I006 | Q006 | I007 | Q007 |
| ONE SET OF MEASUREMENT | | 383 | I124 | Q124 | I125 | Q125 | I126 | Q126 | I127 | Q127 |
| | | 384 | I000 | Q000 | I001 | Q001 | I002 | Q002 | I003 | Q003 |
| | | | I004 | Q004 | I005 | Q005 | I006 | Q006 | I007 | Q007 |
| | | | I124 | Q124 | I125 | Q125 | I126 | Q126 | I127 | Q127 |
| | | | I000 | Q000 | I001 | Q001 | I002 | Q002 | I003 | Q003 |
| | | | I004 | Q004 | I005 | Q005 | I006 | Q006 | I007 | Q007 |
| | | 511 | I124 | Q124 | I125 | Q125 | I126 | Q126 | I127 | Q127 |

| MEMORY ADDRESS | MOVING-AVERAGE DATA MEMORY | | | | | | | |
|---|---|---|---|---|---|---|---|---|

IN-CHIP PHASE 0/4

| Address | | | | | | | | |
|---|---|---|---|---|---|---|---|---|
| 000 | I000 | Q000 | I001 | Q001 | I002 | Q002 | I003 | Q003 |
| 001 | I004 | Q004 | I005 | Q005 | I006 | Q006 | I007 | Q007 |
| ⋮ | | | | | | | | |
| 032 | I124 | Q124 | I125 | Q125 | I126 | Q126 | I127 | Q127 |

IN-CHIP PHASE 2/4

| Address | | | | | | | | |
|---|---|---|---|---|---|---|---|---|
| 033 | I000 | Q000 | I001 | Q001 | I002 | Q002 | I003 | Q003 |
| 034 | I004 | Q004 | I005 | Q005 | I006 | Q006 | I007 | Q007 |
| ⋮ | | | | | | | | |
| 063 | I124 | Q124 | I125 | Q125 | I126 | Q126 | I127 | Q127 |

WIRELESS COMMUNICATION APPARATUS, WIRELESS COMMUNICATION METHOD, PROPAGATION MEASUREMENT APPARATUS AND PROPAGATION MEASUREMENT METHOD

CROSS REFERENCES TO RELATED APPLICATIONS

The present invention contains subject matter related to Japanese Patent Application JP 2004-266211 filed in the Japanese Patent Office on 14 Sep., 2004, the entire contents of which being incorporated herein by reference.

BACKGROUND OF THE INVENTION

1. Field of the Invention

The present invention relates to a wireless communication apparatus, a wireless communication method, a propagation measurement apparatus and a propagation measurement method for receiving a spectrum-spread transmission signal. In particular, the present invention concerns a wireless communication apparatus, a wireless communication method, a propagation measurement apparatus and a propagation measurement method for performing propagation measurement using a preamble section of the spectrum-spread transmission signal.

More specifically, the present invention relates to a wireless communication apparatus, a wireless communication method, a propagation measurement apparatus and a propagation measurement method for performing propagation measurement by despread of each spread code in the baseband section having a clock frequency not more than a chip rate in an RF section. In particular, the present invention concerns a wireless communication apparatus, a wireless communication method, a propagation measurement apparatus and a propagation measurement method for performing propagation measurement using a plurality of despreaders that despread each chip of a short code, in consideration of a trade-off between speed enhancement and circuit scale and power consumption.

2. Description of the Related Art

Canonical standards concerning wireless networks can include IEEE (The Institute of Electrical and Electronics Engineers) 802.11 (e.g., see non-patent document 1), Hiper-LAN\2 (e.g., see non-patent document 2 or 3), IEEE802.15.3, and Bluetooth communication, for example. The IEEE802.11 has enhanced standards such as IEEE802.11a, IEEE802.11b, etc. depending on differences of wireless communication systems and frequency bands.

Further, in recent years, so-called "ultra-wideband (UWB) communication" for carrying out wireless communication that uses a very wide frequency band such as 3 GHz-10 GHz is attracting attention as a short-distance, ultra-high-speed wireless communication system, and is expected to be put to practical use (e.g., see non-patent document 4). At present, a data transmission system having a packet structure including a preamble is being developed as an access control system of ultra-wideband (UWB) communication, in IEEE802.15.3 and the like.

The UWB communication has high time resolution by employing very narrow pulses, and this property enables "Ranging" for radar and positioning. In particular, recent UWB communications can include high-speed data transmission exceeding 100 Mbps (e.g., see patent document 1) along with the original ranging function (e.g., see patent document 1).

It is anticipated that WPAN (Wireless Personal Access Network) represented by the UWB as short-distance communication will be employed in various kinds of household electrical appliances and CE (Consumer Electronics) devices in the feature, and home networks and P-to-P transmission exceeding 100 Mbps between CE devices are expected to be achieved. If the use of millimeter wave bands becomes widespread, it becomes possible to achieve short-distance wireless communication exceeding 1 Gbps and also an ultra-high-speed DAN (Device Area Network) for short-distance communication including a storage device etc.

A recent trend is to put SS (Spread Spectrum) based wireless LAN systems to practical use. With the spread spectrum, even if there is communication using the same frequency in the neighborhood, a C/I required for enabling normal communication can be set below 0 dB. That is, even if a communication apparatus detects a signal of another apparatus at the same level as that of the apparatus, the apparatus can still communicate. In particular, the spread spectrum is convenient to use in the UWB since the occupied bandwidth of the UWB is originally much wider than the required bit rate.

The SS systems include the DS (Direct Spread) system. According to this system, the transmission side multiplies an information signal by a random code sequence called a PN (Pseudo Noise) code to spread an occupied band for transmission. The reception side multiplies the received spread information signal by the PN code to despread the information signal for reproduction.

The UWB transmission system includes two types: DS-UWB and impulse-UWB. The DS-UWB system maximizes spread speeds of DS information signals. The impulse-UWB system employs an impulse signal sequence having a very short period of approximately several hundreds of picoseconds.

The DS-UWB system can control spectra using PN code speeds, but needs to operate logic circuits with a high speed of the order of GHz, so that undesirably the power consumption easily increases. On the other hand, the impulse-UWB system can be configured in combination with a pulse generator and a low-speed logic circuit, so that there is an advantage of reducing the current consumption. However, disadvantageously, it is difficult to control spectra using the pulse generator.

Both systems can achieve high-speed data transmission by spreading signals to an ultra wide frequency band such as 3 GHz to 10 GHz for transmission and reception. The occupied bandwidth is of the order of GHz, and the occupied bandwidth divided by the center frequency (e.g., 1 GHz-10 GHz) is approximately 1. The occupied bandwidth is ultra wideband compared to bandwidths normally used in wireless LANs based on the W-CDMA or cdma2000 system, and the SS (Spread Spectrum) or OFDM (Orthogonal Frequency Division Multiplexing) system.

Conventionally, there has been used a Gaussian monocycle pulse as an impulse signal for UWB transmission. Let us compare a Gaussian monocycle pulse with a rectangular wave monocycle pulse to examine requirements for the device linearity in pulse generation. An example here uses the rectangular wave monocycle pulse of $T_p=200$ [ps] and 1 [V]. The Gaussian monocycle pulse follows the equation below. In the equation, constants such as 3.16 and 3.3 are found to provide a spectrum equivalent to the rectangular wave monocycle pulse.

$$x(t) = 3.16 \frac{t}{T_p} \exp\left[\left(3.3 \frac{t}{T_p}\right)^2\right] \quad (1)$$

FIG. 23 shows time waveforms. FIG. 24 shows a comparison between frequency characteristics of power spectrum densities for these monocycle pulses. The power spectrum densities [W/Hz=J] in the case where the voltage pulses are transmitted at one pulse per second and are driven under the condition of 50 ohms are shown in FIG. 24.

As can be seen from FIG. 24, a pulse of 100 MHz will yield the power density 80 dB higher than this value. The pulse peak here indicates a power density of approximately −211 dBJ. Consequently, the pulse of 100 MHz yields approximately −131.3 [dBW/Hz=dBJ] just equivalent to the FCC specification of −41.3 [dBm/MHz].

Therefore, the following can be concluded.

(1) The Gaussian monocycle pulse is almost the same as the rectangular wave monocycle pulse in the transmission band. (2) The Gaussian monocycle pulse generates a higher peak voltage than the rectangular wave monocycle pulse, requires the linearity, and makes processing difficult including power amplification.

The conventional UWB communication uses monocycle pulses. FIG. 25 shows the frequency characteristics of power spectrum densities in FIG. 24 in terms of antilogarithms instead of decibels. Though there is no special need for using antilogarithms, the linear representation of energy provides many intuitive benefits.

The spectrum has the following two requirements.

(1) The FCC specifications for spectrum masks disable radiation of 3 GHz or less. (2) The band ranging from 4.9 GHz to 5.3 GHz contains a 5-GHz wireless LAN that should be avoided.

The following can be observed from the linearly displayed power spectrum.

(1) If the above-mentioned requirements are not satisfied, only about half of the power [3 dB] is transmitted. (2) A pulse wave form is expected to be disturbed. The receiving side allows just another half of the energy to pass through a matched filter. (3) There is caused a loss of 6 dB or more in total.

FIG. 26 shows a configuration example (conventional example) of a receiver in the UWB communication system. The configuration of the receiver in FIG. 26 is similar to that of a DS-SS (direct sequence spread spectrum) receiver.

The example in FIG. 26 assumes that the VCO oscillates at the same frequency as the pulse frequency.

The receiver follows the VCO timing and generates a pulse train having data all set to zeros. Using this, the receiver generates three waveforms each deviated for half of pulse width $T_p$, i.e., $T_p/2$, and multiplies them by a received signal.

By intentionally deviating the VCO frequency a small amount at the time of detecting a pulse position, a pulse timing match will occur at some point in time (Sliding Correlation).

When a pulse timing match occurs, the energy increases as a result of the multiplication, making it possible to detect the pulse position.

When the pulse position is detected, the intentionally deviated VCO frequency is returned to the correct frequency. At the same time, a tracking operation takes place in order to maintain this timing.

The received signal is multiplied by the waveforms deviated for $\pm T_p/2$ against the center (puncture) to find energies. Differences are used to detect positive and negative values corresponding to positive and negative pulse position errors. These values are supplied to loop filters and are used as control voltages for the pulse position tracking.

However, the receiver configured as shown in FIG. 26 needs to divide a signal path into three and use three multiplication-oriented circuits, thus complicating the circuitry.

Further, the receiver needs to change frequencies for search and tracking operations. The time needed for this changeover prolongs the time for synchronization establishment.

Pulse positions need to be correctly detected under a noise environment. For this purpose, it is necessary to detect that the energy increases more than once. A frequency is intentionally deviated by a slight amount. After the energy increases more than once, resulting values are averaged. Thereafter, pulse positions needed to be detected. Consequently, the time to establish the synchronization becomes lengthy.

Analog circuits are used to configure systems for frequency deviation and tracking. However, analog circuits are often complex and are subject to variance, making it difficult to ensure stable operations.

Energy values are used for the pulse position detection and tracking, thus degrading the S/N ratio and characteristics.

[Patent document 1] PCT Japanese Translation Patent Publication No. 2002-517001

[Non-patent document 1] International Standard ISO/IEC 8802-11:1999 (E) ANSI/IEEE Std 802.11, 1999 Edition, Part11: Wireless LAN Medium Access Control (MAC) and Physical Layer (PHY) Specifications

[Non-patent document 2] ETSI Standard ETSI TS 101-761-1V1.3.1 Broadband Radio Access Networks (BRAN); HIPERLAN Type 2; Data Link Control (DLC) Layer; Part1: Basic Data Transport Functions

[Non-patent document 3] ETSI TS 101 761-2 V1.3.1 Broadband Radio Access Networks (BRAN); HIPERLAN Type 2; Data Link Control (DLC) Layer; Part2: Radio Link Control (RLC) sublayer

[Non-patent document 4] NIKKEI ELECTRONICS Mar. 11, 2002, pp. 55-66 "Ultra Wideband: Revolutionary Wireless Technology is Born"

In addition to the above-mentioned related art, there have been proposed by the present assignee a technique related to the present invention as disclosed in U.S. patent application Ser. No. 2004-0179582.

SUMMARY OF THE INVENTION

It is desirable to provide a wireless communication apparatus, a wireless communication method, a propagation measurement apparatus and a propagation measurement method excellent at being able to transmit and receive using a pulse that solves spectrum problems in an ultra-wideband communication system.

It is particularly desirable to provide a method of high-speed propagation measurement in an ultra-wideband communication system combined with the DS-SS (direct sequence spread spectrum) for improving resistance to interfering waves.

According to an embodiment of the present invention, there is provided a wireless communication apparatus for receiving a code-spread transmission signal. The wireless communication apparatus includes an RF section, and a baseband section, wherein in the baseband section, despreaders of an integral submultiple, which is $1/n_1$, of the number of chips of a spread code are arranged in parallel, and there is provided a propagation measurement section that measures a propagation channel by using the plurality of despreaders a plurality of times in a time-division manner and performing despread of each period corresponding to a chip rate of the spread code.

Ultra-wideband communication for carrying out wireless communication that uses a very wide frequency band such as 3 GHz-10 GHz is attracting attention as a short-range, ultra-high-speed wireless communication system, and is expected to be put to practical use. Further, there is also developed an ultra-wideband communication system combined with the DS-SS (direct sequence spread spectrum) for improving resistance to interfering waves.

A receiver of a regular spread-spectrum (SS) system can operate the baseband at the same clock frequency as the chip rate. However, for the UWB system, the use of the same clock frequency as the chip rate causes excessive power consumption. Therefore, in the wireless communication apparatus according to the embodiment of the present invention, the integral submultiple of the chip rate is employed as the clock frequency to the baseband section.

Further, a receiver of a regular spread-spectrum (SS) system can operate the baseband at the same clock frequency as the chip rate and perform propagation measurement by sliding correlation. However, for the UWB system, the integral submultiple of the chip rate is employed as the clock frequency to the baseband section. Thus, the propagation measurement section despreads each short code to perform propagation measurement.

In such a case, from the viewpoint of speed enhancement, it is ideal to implement a plurality of despreaders corresponding to the number of chips of the spread code in the propagation measurement section and operate the despreaders concurrently. However, it is disadvantageous in terms of circuit scale and circuit power consumption to implement the despreaders corresponding to the number of chips of the spread code in the propagation measurement section.

Thus, the present invention, in consideration of a trade-off between speed enhancement and circuit scale and power consumption, arrange in parallel a smaller number of despreaders than the number of chips of the spread code and use the despreaders several times in a time-division manner to perform despread computations on all chips.

For example, if the number of chips of the spread short code is 128, an integral submultiple of the number of chips of the spread short code, specifically 32 despreaders which correspond to one quarter are arranged in parallel and used four times in a time-division manner, thereby measuring 128 points (=32 despreaders×4 times).

The propagation measurement section includes a delay line circuit that buffers parallel reception signals from the RF section and converts into serial data in chronological order, a plurality of despread circuits and accumulation circuits that are separated into a number of groups, a selector circuit that selects outputs of each group of despreaders and accumulators, a moving-average circuit that performs moving-average computations on propagation measurement results of the despread circuits and accumulation circuits, a memory circuit that stores values before and after a computation by the moving-average circuit, an energy calculation circuit that calculates an energy level of a reception signal, and a path detection circuit that sorts an energy value of each receiving position and outputs the energy value along with position information thereof. The propagation measurement section adopts as a propagation measurement value, a value obtained by despreading reception signal sampled at chip timing of A/D conversion in the RF section using a short code for propagation measurement.

The configuration of the propagation measurement section enables high-speed propagation estimation, which enables high-speed detection of a symbol/pulse position. In ultra-wideband communication using a signal spread over a bandwidth of several GHz, it is not possible to detect a carrier. However, high-speed detection of a symbol/pulse enables operations such as CSMA (Carrier Sense Multiple Access) equivalent to a carrier sense, so that it becomes possible use random access systems such as CSMA. Further, it becomes possible to easily obtain parameters needed to RAKE reception using propagation estimation results.

Further, the propagation measurement section may further include a rounding circuit that rounds selected output values of the despreaders and accumulators. In this case, the appropriate setting of computation accuracy leads to higher-speed circuit processing.

The wireless communication apparatus may further include a reception control section that can control sampling timing of A/D conversion in the RF section. For example, after the completion of propagation measurement at in-chip phase 0/4, the sampling phase is shifted by 180 degrees, thereby enabling measurement at in-chip phase 2/4 as well. Thus, time resolution of a measurement period can be enhanced.

Further, the wireless communication apparatus according to an embodiment of the present invention may further includes a preamble end detection section that detects an end of a preamble signal, and a RAKE combining section that RAKE-combines energy of a multipath signal and demodulates a signal. By RAKE reception, the despread process separates an intended signal from the received signal composed of a plurality of delay waves superposed by a multipath propagation channel. Dispersed signal powers are unified. Since the direct sequence spread spectrum provides an effect of disassembling the time by dint of the despread, this effect is used to combine signals along separated paths by aligning the time and the phase.

Further, the reception signal is generally provided with a preamble section before a data signal to be received, the preamble section is provided with a periodic training section by a plurality of spread short codes having good autocorrelation properties. Further, the propagation measurement section and the preamble end detection section perform propagation measurement and preamble end detection with respective short codes. In this case, an information signal can be demodulated based on a high-speed propagation measurement result. Further, an end position of the preamble section, that is, a start position of data can be found accurately, thus improving reception performance.

The preamble section is further provided with a symbol period spread by using any of the plurality of short codes in order to stabilize AGC. In this case, a reception signal level becomes constant during propagation measurement, thus improving reception performance.

Further, despread computations that each of the despread circuits performs per clock may be equal to the parallel number of input signals.

Further, parallel input signals to each of the despread circuits may be captured at given intervals from a plurality of taps in the delay line circuit.

Further, by giving appropriate despread timing to the plurality of despread circuits and accumulation circuits respectively, measurement time may be reduced.

Further, by giving appropriate despread timing to the plurality of despread circuits and accumulation circuits that are separated into a number of groups respectively, measurement time can be reduced. At this time, assuming that the number of chips of a short code for propagation measurement is A and the number of chips of despread and accumulation computations that the despread circuits and accumulation circuits perform per clock is B, despread timing is given in such a manner that a control period becomes a relation of A÷B clocks. In this case, circuit use efficiency increases, so that it becomes possible to reduce circuit scale.

Further, the propagation measurement section determines that a location where the largest energy is found out of propagation measurement values is a symbol/pulse position and performs a despread computation by a short code for preamble end detection at the pulse position to detect a preamble end position. With this, an end position of a preamble, that is, a head position of a data section can be found quickly and accurately, thus improving reception performance.

Further, the propagation measurement section removes an effect of a symbol pattern of a training section from a measured value by correlating a plurality of paths detected by the path detection circuit with symbol patterns respectively and further performs interpolation, thereby determining a final propagation measurement value. With this, resolution of propagation measurement can be enhanced, thus improving reception performance.

According to the embodiment of the present invention, it is possible to provide a method of high-speed propagation measurement in an ultra-wideband communication system combined with the DS-SS (direct sequence spread spectrum) for improving resistance to interfering waves.

Further, according to the embodiment of the invention, it is possible to provide a wireless communication apparatus, a wireless communication method, a propagation measurement apparatus and a propagation measurement method excellent at being able to perform propagation measurement by despread of each spread code in the baseband section having a clock frequency of an integral submultiple of a chip rate in the RF section.

Furthermore, according to the embodiment of the invention, it is possible to provide a wireless communication apparatus, a wireless communication method, a propagation measurement apparatus and a propagation measurement method excellent at being able to perform propagation measurement using a plurality of despreaders that despread each chip of a short code, in consideration of a trade-off between speed enhancement and circuit scale and power consumption.

These and other features and advantages of the invention will be apparent from the following more particular description of a preferred embodiment of the invention, as illustrated in the accompanying drawings.

BRIEF DESCRIPTION OF THE DRAWINGS

FIG. 21 is an illustration showing a configuration example of a memory map for storing propagation measurement data.

DESCRIPTION OF THE PREFERRED EMBODIMENTS

A UWB-based PAN (Personal Area Network) is not suited to centralized management of frequency resources using a base station or the like. From the viewpoint of reusing spatial frequencies, it is considered to be preferable that maldistributed wireless stations grasp the situation of resource use at adjacent wireless stations and use the frequencies under distributed control. This is especially required of the UWB because it uses an ultra wideband as mentioned above and cannot reuse spatial frequencies by dint of frequency division.

Even if adjacent communications use the same frequency, the use of the spectrum spread can set the C/I needed for enabling normal communication to a level lower than 0 dB. That is to say, if a user detects another user's signal at the same level as that of his or her own, the former is still capable of communication. This is especially easily available to the UWB because it occupies a much wider bandwidth than the required bit rate.

The UWB's bandwidth depends on a pulse width independently of a pulse rate. While a wide bandwidth due to a narrow pulse width signifies a kind of spectrum spread, this is not discussed here for the following reason. In this case, the resistance to interfering waves takes effect if pulse positions differ occasionally. The resistance to interfering waves is not expected if pulse positions match by chance. In other words, it is a matter of chance. Therefore, it is preferable to perform the effective spectrum spread based on direct spread in addition to the spread based on a small pulse width.

The following proposes a propagation measurement method and the like in the ultra-wideband communication system combined with the DS-SS (direct sequence spread spectrum) for improving the resistance to interfering waves. An embodiment of the present invention will be described below in detail with reference to the accompanying drawings.

A. Configuration of a Wireless Communication Apparatus

Figure 1:
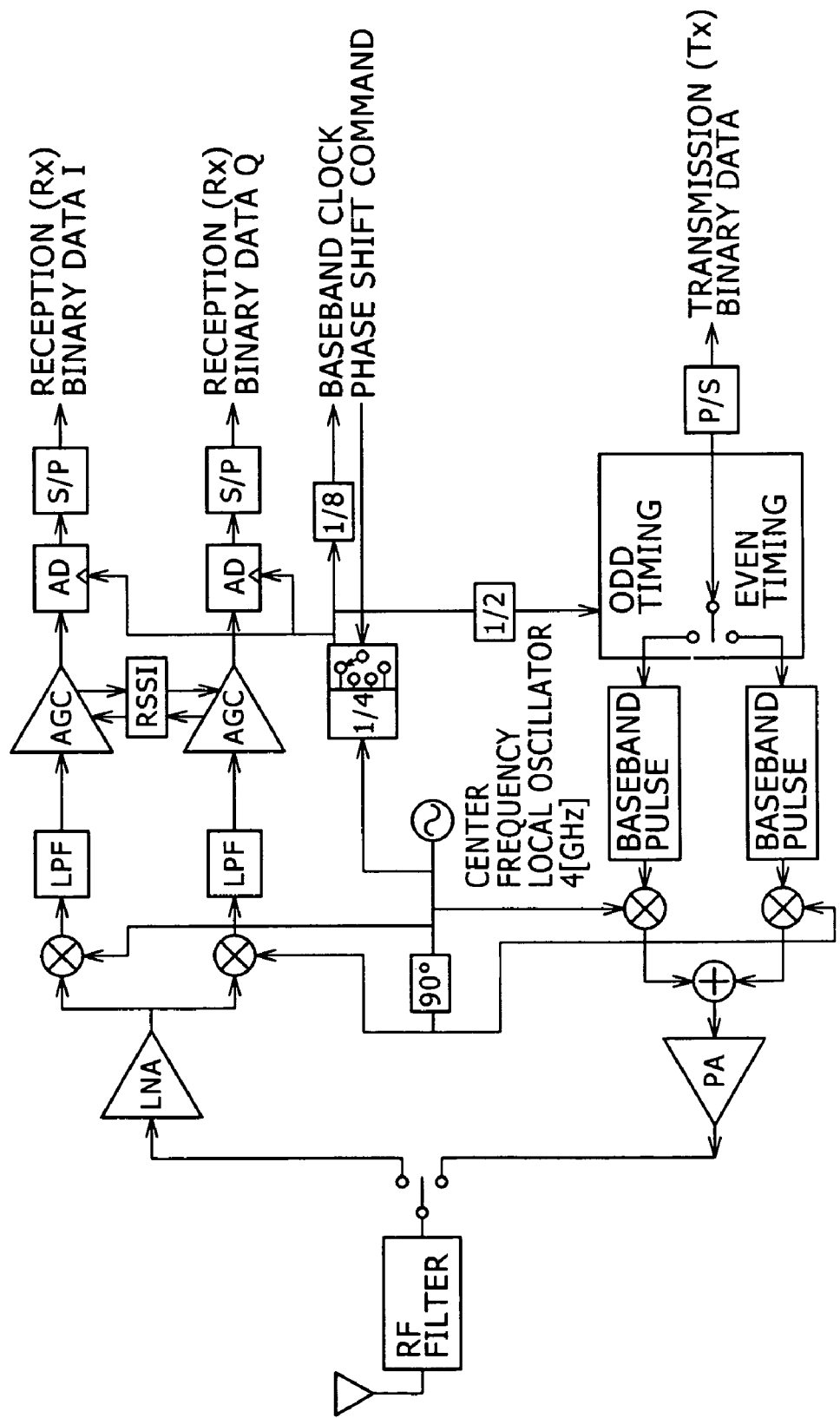
FIG. 1 is an illustration schematically showing the configuration of an RF section in a wireless communication apparatus according to an embodiment of the present invention.

FIG. 1 schematically shows the configuration of an RF section in a wireless communication apparatus according to an embodiment of the present invention. The RF section shown in FIG. 1 is a transmitting/receiving apparatus of a typical π/2 shift BPSK (Binary Phase Shift Keying) system. The RF section can switch between 4 phases of a 1-GHz sampling frequency in accordance with a control signal from a baseband side after A/D conversion.

Figure 2:
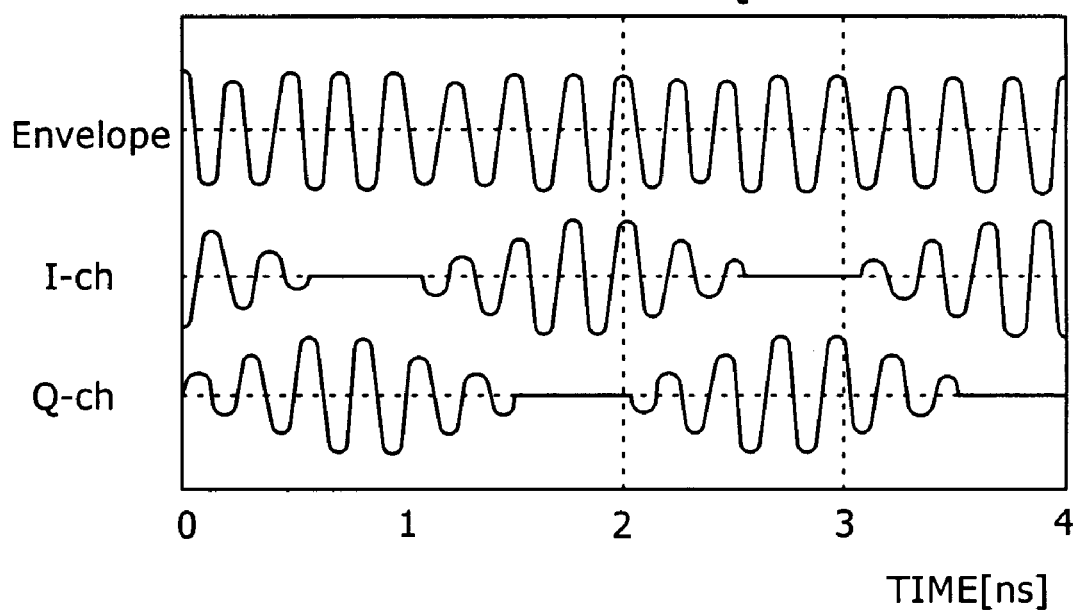
FIG. 2 is an illustration showing signal wave images.

In transmission circuitry, a transmission signal sent from a baseband section is converted from parallel to serial form, and then divided into odd timing and even timing alternately by 500-MHz timing, for pulse shaping. The divided signals are BPSK-modulated by a carrier of 4 GHz in a quadrature relationship, then added, amplified by a power amplifier, and transmitted from an antenna through an RF filter. FIG. 2 shows signal wave images.

In reception circuitry, a wireless signal received by the antenna goes through the RF filter and a low-noise amplifier. The amplified signal, by frequency synthesis of the 4-GHz center frequency signal and the frequency signal having a 90-degree phase difference, for quadrature detection, is separated into I-axis and Q-axis signals and is subject to AGC based on RSSI (Received Signal Strength Indication). Further, the signals are sampled at 1-GHz as digital signals by an A/D converter. Furthermore, the sampled I/Q signals are converted from serial to parallel form, and then digitally processed by the baseband section.

A 4-GHz local frequency generated by a local oscillator is a carrier frequency at the RF section.

Further, the carrier frequency is divided by four to provide the A/D converter with a sample rate, that is, a 1-GHz chip rate.

The 1-GHz chip rate is further divided by eight to give a 125-MHz clock frequency to the baseband section (described later).

The clock frequency to the baseband section is an integral submultiple of the chip rate and is selected from operating speeds that are practicable in the process. A receiver of a regular spread-spectrum (SS) system can operate the baseband at the same clock frequency as the chip rate. However, for the UWB system, the use of the same clock frequency as the chip rate causes excessive power consumption; therefore, the integral submultiple of the chip rate is employed.

Further, the oscillator switches chip timing; that is, an in-chip phase from 0/4 to 2/4 in response to a phase shift command (PhaseShift) from the baseband section.

Figure 3:
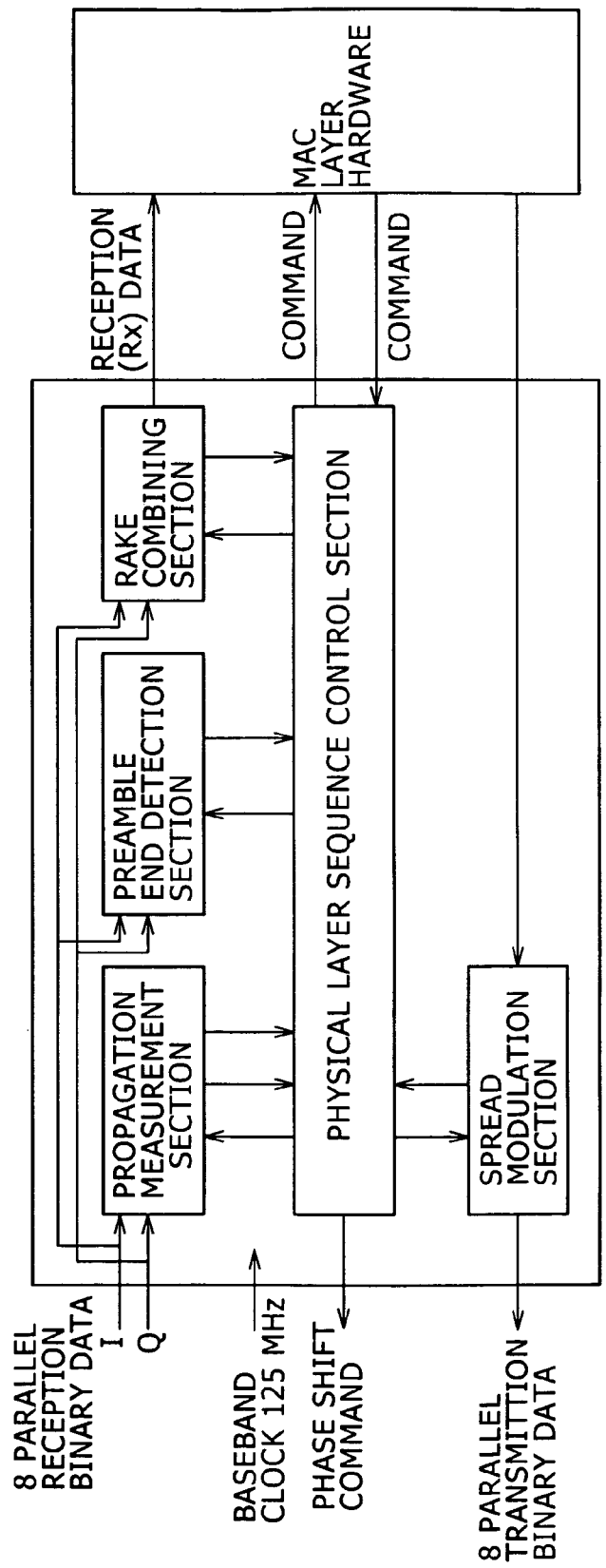
FIG. 3 is an illustration schematically showing the configuration of a baseband section in a wireless communication apparatus according to an embodiment of the present invention.

FIG. 3 schematically shows the configuration of the baseband section in the wireless communication apparatus according to the embodiment of the present invention. Transmission circuitry in the baseband section shown in FIG. 3 includes a spread modulation section (Direct Spreader) that spreads an information signal. Reception circuitry in the baseband section includes a propagation measurement section (Channel Measure) that measures a delay profile of a propagation channel, a preamble end detection section (PreambleEndDetect) that detects the end of a preamble signal, and a RAKE combining section that RAKE-combines energy of a multipath signal and demodulates the signal. Each function section in the transmission/reception circuitry is subject to centralized control by a physical layer sequence control section (PhySequeneControl).

In the transmission circuitry of the baseband section, the spread modulation section directly spreads a transmission signal sent from a MAC layer control section corresponding to an upper layer of a communication protocol, and sends the spread signal to the transmission circuitry in the RF section. A description will be given later as to signal processing in the reception circuitry of the baseband section.

B. Signal Format and Preamble Pattern

Figure 4:
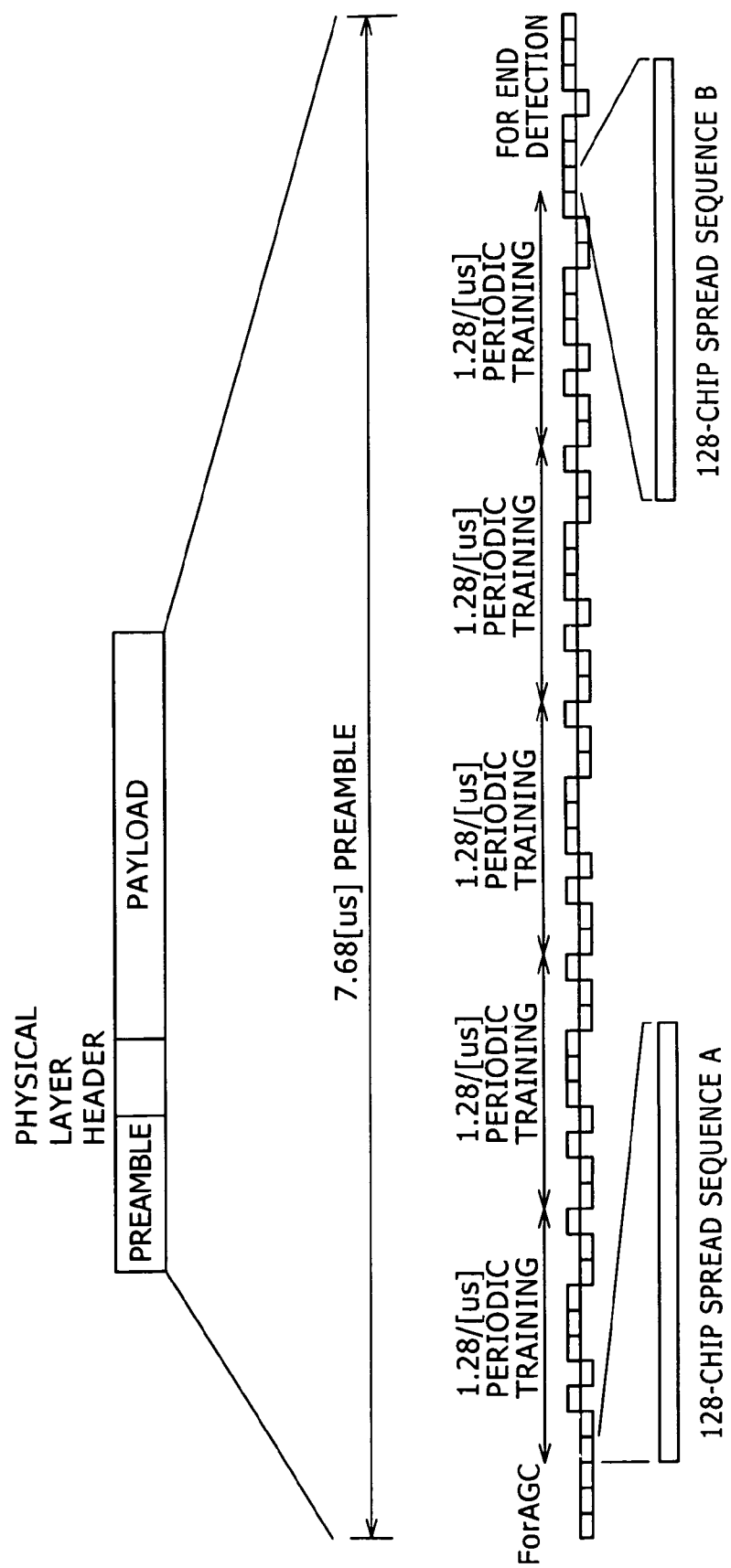
FIG. 4 is an illustration showing a configuration example of a signal format and a preamble pattern.

FIG. 4 schematically shows an example of the format structure of a signal used for wireless transmission.

As shown in FIG. 4, a transmission signal is composed of a preamble (Preamble) section for performing processing for signal detection and synchronization, a PHY header section in which control information for a PHY layer is described, and a payload (Payload) section. The payload section can be further separated into a MAC header section and a MAC payload section, which are not directly related to the gist of the invention; therefore, a description thereof is omitted here.

The preamble section is composed of short code patterns (Spread Sequence) consisting of 128 chips each. In this embodiment, there are prepared two short code patterns A and B having good autocorrelation properties.

Pattern B is repeated a plurality number of times at the head of the preamble section, which is used as an area for stabilizing AGC gain. In the example shown in FIG. 4, pattern B is repeated three times for the AGC, and the relevant area needs to be ensured for just a period that allows the AGC to be stable.

Further, after the area for the AGC, a training pattern for propagation measurement consisting of 10 symbols of pattern A is repeated five times to be arranged.

Furthermore, after the training patterns, there is arranged a pattern for preamble end detection consisting of seven patterns B.

However, the gist of the invention is not limited to the format structure shown in FIG. 4, and it is possible to change a parameter value constituting each pattern as necessary.

C. Reception Signal Processing

Figure 5:
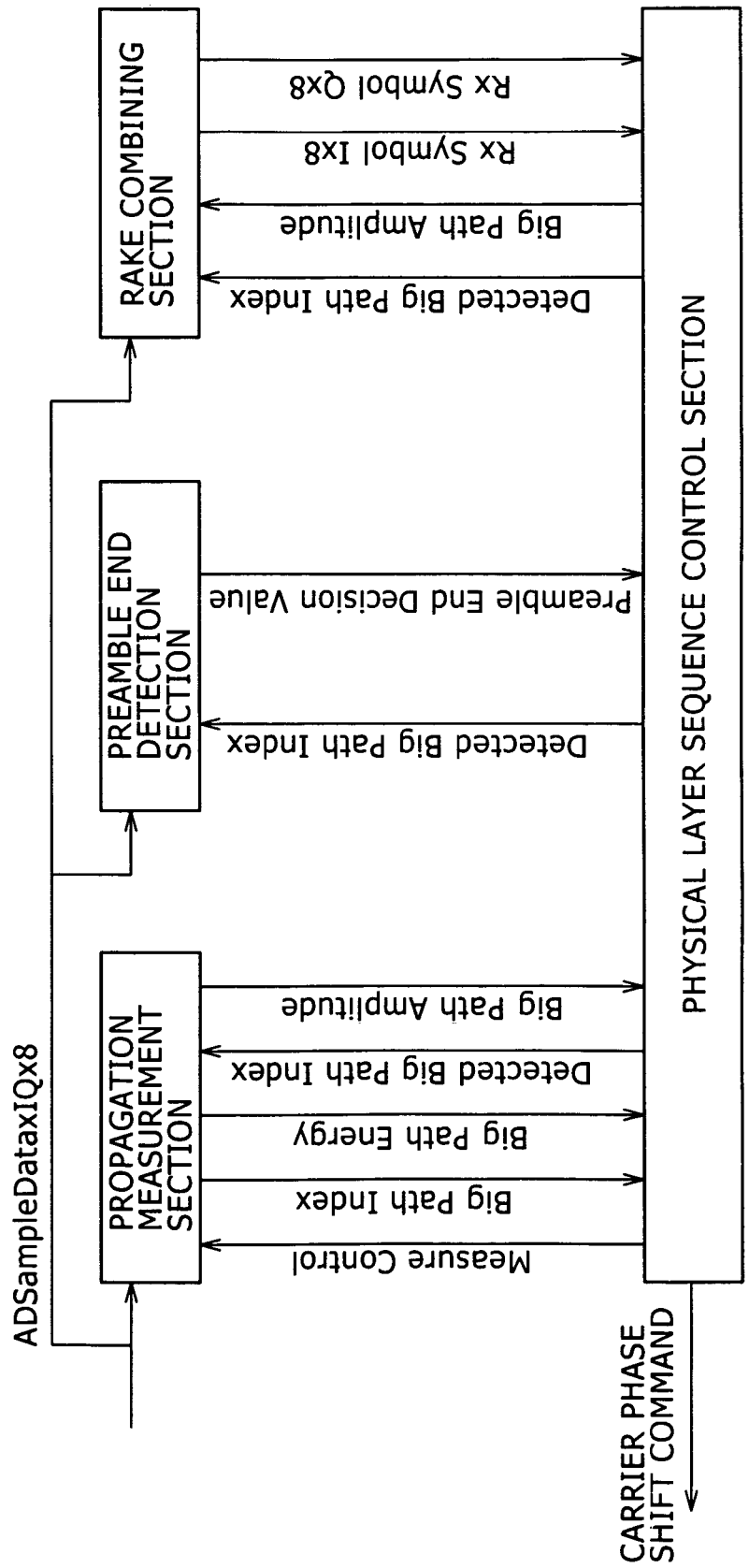
FIG. 5 is an illustration showing a more detailed configuration of reception circuitry shown in FIG. 3.

FIG. 5 shows a more detailed configuration of the reception circuitry shown in FIG. 3. The reception circuitry in the baseband section includes the propagation measurement section (Channel Measure) that measures a delay profile of a propagation channel, the preamble end detection section (PreambleEndDetect) that detects the end of a preamble signal, and the RAKE combining section that RAKE-combines energy of a multipath signal and demodulates the signal. Each function section is subject to centralized control by the physical layer sequence control section (PhySequenceControl).

In the description below, let us assume that the carrier frequency of the RF section is 4 GHz, the sample rate for A/D conversion (i.e., chip rate) is 1 GHz, and the clock frequency to the baseband section is 125 MHz.

The clock frequency to the baseband section is an integral submultiple of the chip rate and is selected from operating speeds that are practicable in the process. In this embodiment, a 125-MHz clock frequency corresponds to one-eighth of a 1-GHz chip rate. A receiver of a regular spread-spectrum (SS) system can operate the baseband at the same clock frequency as the chip rate. However, for the UWB system, the use of the same clock frequency as the chip rate causes excessive power consumption; therefore, the integral submultiple of the chip rate is employed.

C-1. Processing at the Propagation Measurement Section

By quadrature detection with the 4-GHz carrier frequency and the frequency having a 90-degree phase difference, a preamble signal received at the RF section is separated into I-axis and Q-axis signals, which are converted into digital signals by the A/D converters, and inputted to the propagation measurement section (Channel Measure) for measuring a delay profile of a propagation channel.

A receiver of a regular spread-spectrum (SS) system can operate the baseband at the same clock frequency as the chip rate. In this case, it is possible to perform propagation measurement by sliding correlation. However, for the UWB system, the use of the same clock frequency as the chip rate causes excessive power consumption; therefore, the integral submultiple of the chip rate is employed as the clock frequency to the baseband section, as described above. Thus, it is not possible to perform propagation measurement by sliding correlation.

For this reason, in this embodiment, the propagation measurement section despreads each short code to perform propagation measurement. A period to be measured is as follows: The number of chips of a short code 128×chip rate 1 ns=128 ns.

Further, the resolution for the measurement is selected to be 250 ps (=1/4 GHz) which is a period corresponding to the 4-GHz carrier frequency. There are four measurement points having phase differences of 250 ps each regarding the 1-ns chip rate. The respective measurement points are referred to as points 0/4, 1/4, 2/4, and 3/4 of in-chip phases.

A description will be made on the measurement procedure for the in-chip phases in the propagation measurement section. The propagation measurement section measures a propagation channel in response to a propagation measurement command (MeasureControl) from the physical layer sequence control section.

First, the propagation measurement section measures point 0/4 of the in-chip phases. It measures a 128-ns period, namely, 128 points over 0.64 µs (80 clocks of the baseband). After the completion of point 0/4, the propagation measurement section selects a predetermined number (N) of paths of higher signal levels from 128 points and outputs the respective positions (BigPathIndex) and energy values (BigPathEnergy) to the physical layer sequence control section.

Upon receiving the measurement result of point 0/4, the physical layer sequence control section outputs a phase shift command (PhaseShift) to the RF section. The RF section switches the in-chip phase from 0/4 to 2/4 in response to the phase shift command.

Next, the propagation measurement section measures point 2/4 of the in-chip phases in response to a propagation measurement command (MeasureControl) from the physical layer sequence control section. It measures a 128-ns period, namely, 128 points over 0.64 µs (80 clocks of the baseband). After the completion of point 2/4, the propagation measurement section selects a predetermined number (N) of paths of higher signal levels from 128 points and outputs the respective positions (BigPathIndex) and energy values (BigPathEnergy) to the physical layer sequence control section (same as above).

At this point in time, the propagation measurement section completes the first measurement on points 0/4 and 2/4 of the in-chip phases. From this point forward, the propagation measurement section repeats the same measurement and obtains the moving average of the measurement results, thereby improving the S/N ratio of the measurement values.

Figure 6:
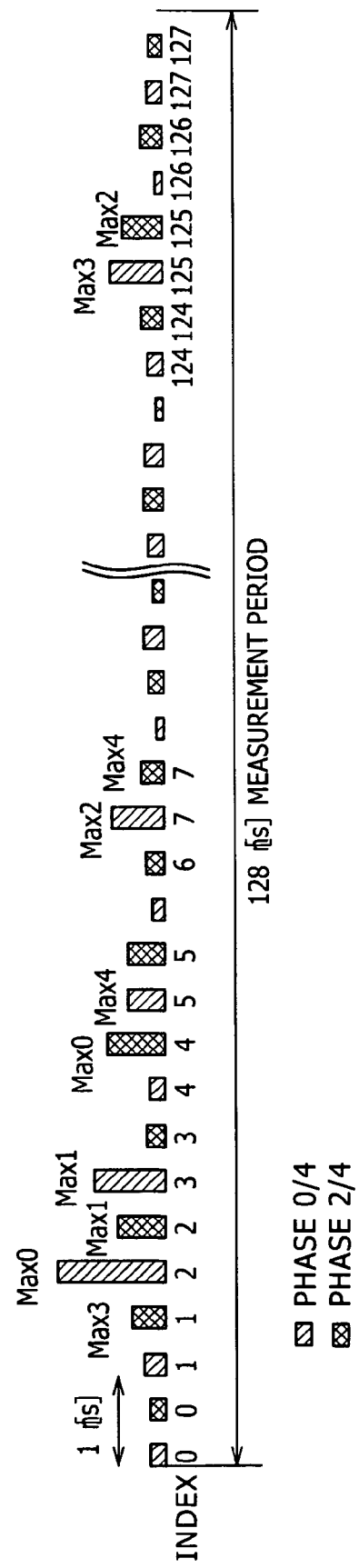
FIG. 6 is an illustration exemplifying an image in which a propagation measurement section measures energy values for a 128-ns period at points 0/4 and 2/4 of in-chip phases.

FIG. 6 exemplifies an image in which the propagation measurement section measures energy values for a 128-ns period at points 0/4 and 2/4 of the in-chip phases. In FIG. 6, the respective 128 measurement points of in-chip phases 0/4 and 2/4 are alternately arranged in the 128-ns period. Further, the propagation measurement section selects respective N paths in decreasing order of signal level (N=5 in the example of FIG. 6, namely, Max 0 to Max 4) at in-chip phases 0/4 and 2/4, and outputs the positions (Index) and the energy values to the physical layer sequence control section.

C-2. Processing at the Preamble End Detection Section

Upon receiving the signal, the physical layer sequence control section completes the propagation measurement and passes the position (Index) of the path having the maximum detected energy to the preamble end detection section. In the example of FIG. 6, Index 2 is passed as the position information.

The preamble end detection section detects a signal indicting the end of the preamble as to this maximum path and returns this value (PreambleEndDetectDecisionValue) to the physical layer sequence control section.

Figure 7:
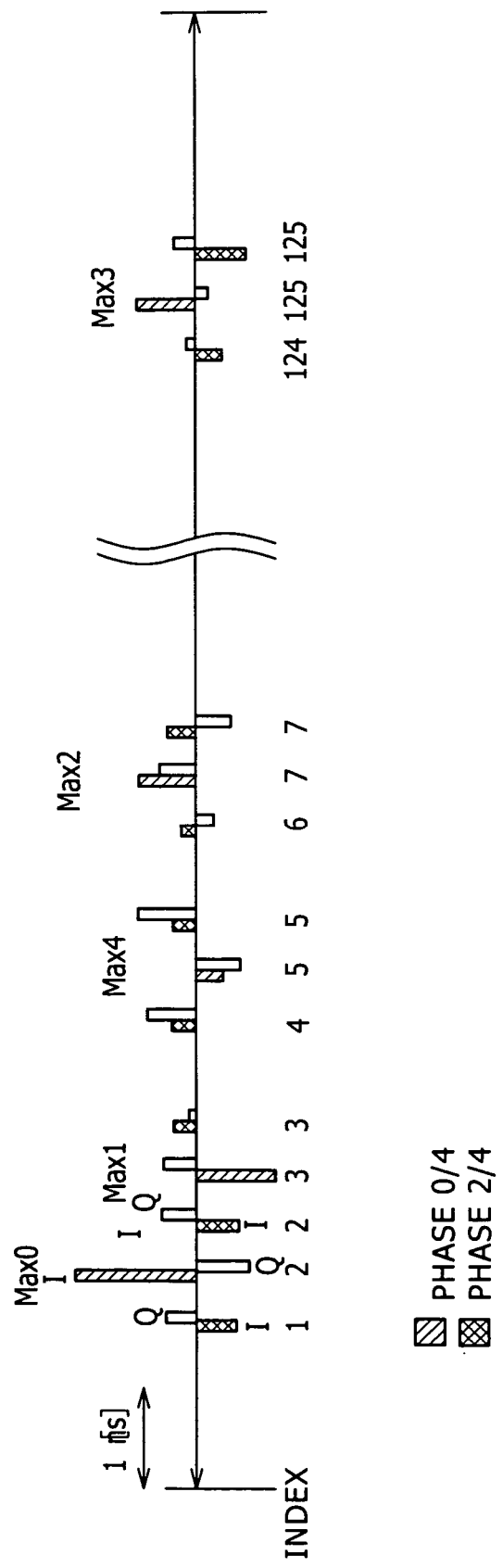
FIG. 7 shows an image in which a complex amplitude value having a ±2/4 in-chip phase difference from the position (Index) of a detected path is obtained from a propagation measurement section.

In parallel with the above-mentioned preamble end detection processing, the physical layer sequence control section obtains from the propagation measurement section, complex amplitude values having ±2/4 in-chip phase differences from the position (Index) of the detected path. Since the example of FIG. 6 produces complex amplitude values shown in FIG. 7, the propagation measurement section sends (1, 2, 2), (2, 3, 3), (4, 5,5), (6, 7, 7), and (124, 125, 125) to the physical layer sequence control section. As described later, these complex amplitude values are used to obtain, by interpolation, amplitudes at in-chip phases shifted by ±1/4, namely, at points 1/4 and 3/4.

C-3. Interpolation

The physical layer sequence control section removes the effect of training patterns applied to the preambles included in the measurement data of propagation path complex amplitude values regarding the respective N paths at points 0/4 and 2/4 of the in-chip phases received from the propagation measurement section. After that, the physical layer sequence control section interpolates the complex amplitude values at points shifted by ±1/4 from the measured points, namely, at points 1/4 and 3/4 of the in-chip phases. The use of the interpolated values can improve the accuracy of preamble end detection in comparison with using only the measurement values at points 0/4 and 2/4 of the in-chip phases.

Figure 8:
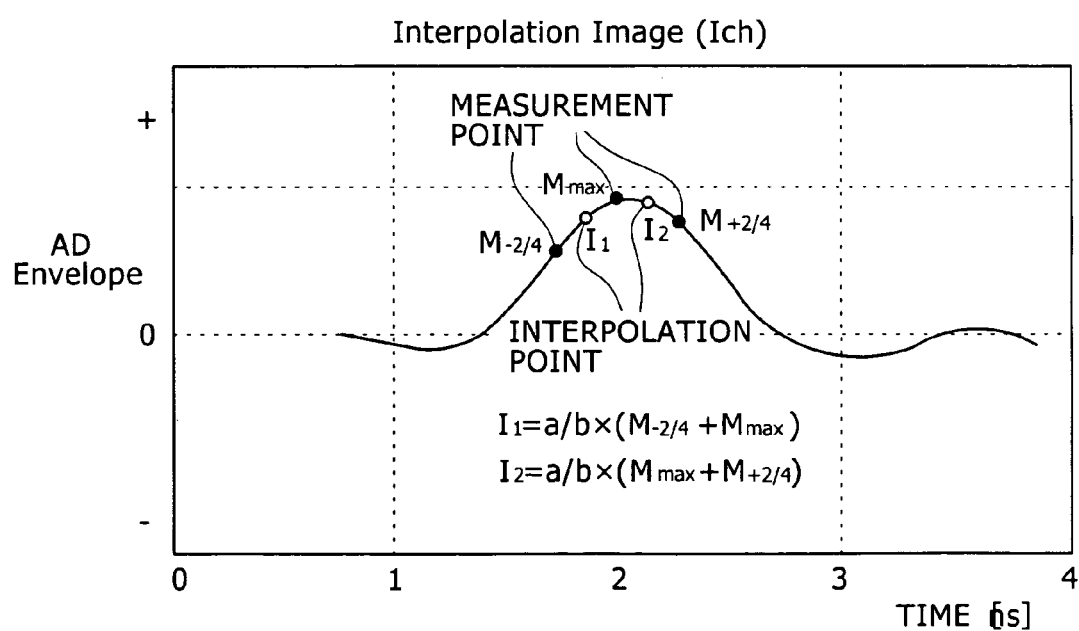
FIG. 8 shows an image in which interpolation is performed using complex amplitude values of paths detected by a propagation estimation section and complex amplitude values at positions shifted by ±2/4 phase from the detected positions.

This interpolation is performed using complex amplitude values of paths detected by a propagation estimation section and complex amplitude values at positions shifted by ±2/4 phases from the detected positions. FIG. 8 shows an image of the interpolation. Assuming that the amplitude value of the detected path is $M_{max}$ and the measurement values at the positions shifted by ±2/4 phases from the detected position are $M_{-2/4}$ and $M_{+2/4}$ respectively, the interpolated values $I_1$ and $I_2$ can be obtained by the following equations:

$$I_1 = a/b \times (M_{-2/4} + M_{max})$$

$$I_2 = a/b \times (M_{max} + M_{+2/4})$$

where a and b are integers and are set to numbers that approximate an amplitude curve and facilitate a hardware structure. In this embodiment, the selected numbers are as follows: a=9 to 10, b=16.

Figure 9:
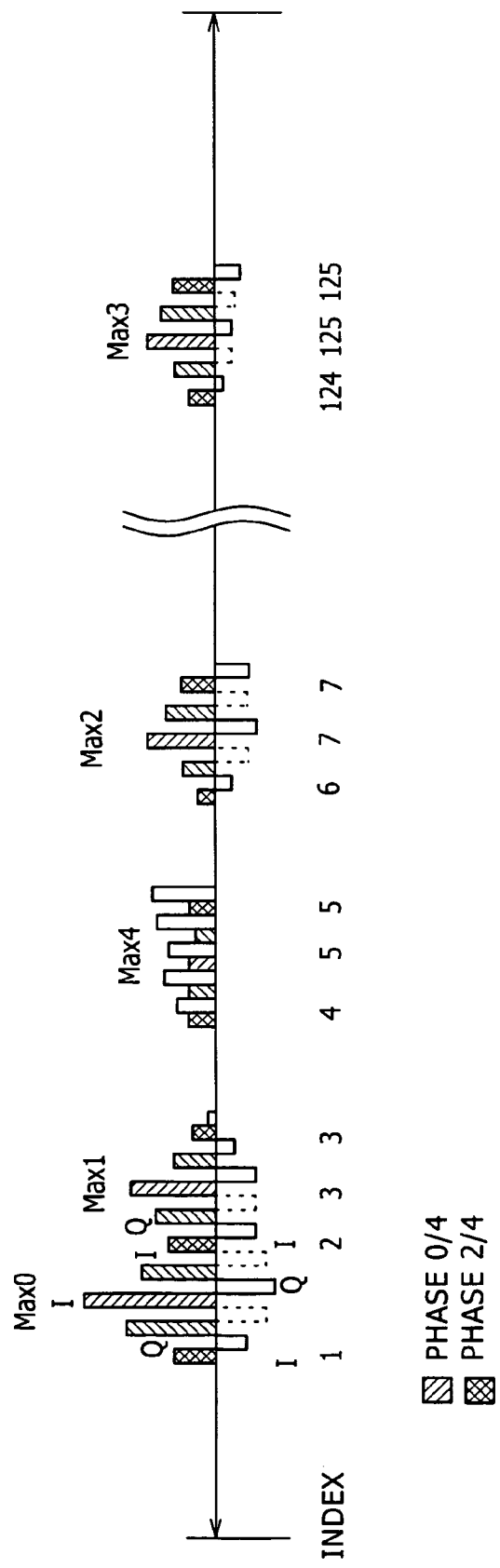
FIG. 9 shows an image in which the amplitude values at points 1/4 and 3/4 of in-chip phases are interpolated over a 128-ns period based on the measurement values at points 0/4 and 2/4 of in-chip phases shown in FIG. 6.

FIG. 9 shows an image in which the amplitude values at points 1/4 and 3/4 of the in-chip phases are interpolated over a 128-ns period based on the measurement values at points 0/4 and 2/4 of the in-chip phases shown in FIG. 6.

Upon finding an optimum phase from in-chip phases 0/4, 1/4, 2/4, and 3/4, the physical layer sequence control section sends a command for changing chip timing to the RF section to adapt the reception circuit to the phase.

C-4. RAKE Combining Section

Now, we can point out multipath fading as one of problems in transmitting and receiving wireless signals. This phenomenon occurs as follows. A radio wave reflects on buildings and other objects and reaches the receiving side via different paths. Radio waves coming from different directions interfere with each other to disturb the received signal.

RAKE reception signifies reception of a plurality of radio waves. The despread process separates an intended signal from the received signal composed of a plurality of delay waves superposed by a multipath propagation channel. Dispersed signal powers are unified. Since the direct sequence spread spectrum provides an effect of disassembling the time by dint of the despread, this effect is used to combine signals along separated paths by aligning the time and the phase. For example, weights are supplied in accordance with the paths' S/N ratios for maximum ratio combining. The RAKE reception makes it possible to effectively combine chronologically dispersed signal powers into an intended result.

In this embodiment, upon detection of a preamble end by the above-mentioned processing, the main part (i.e., a PHY header and a payload) of data arrives. In accordance with this timing, the physical layer sequence control section sets the respective propagation channel complex amplitude values and spread rates of N paths in the RAKE combining section to start RAKE combining processing. An I-axis component (reception symbol) of output of the RAKE combining section becomes demodulation data.

D. Propagation Measurement Section

This article will describe the propagation measurement section in detail.

A receiver of a regular spread-spectrum (SS) system can operate the baseband at the same clock frequency as the chip rate and perform propagation measurement by sliding correlation. However, for the UWB system, the use of the same clock frequency as the chip rate causes excessive power consumption; therefore, the integral submultiple of the chip rate is employed as the clock frequency to the baseband section, as described above. Thus, the propagation measurement section despreads each short code to perform propagation measurement.

The propagation measurement section measures 128 points every A/D sampling period of 1 ns, corresponding to in-chip phase 0/4 of a spread short code consisting of 128 chips. Assume that a signal reception period is sufficiently short with respect to time variation of a propagation channel. Thus, it can be considered that a multipath level is nearly constant during reception.

Since there is used a spread short code consisting of 128 chips, 1 point requires 128 despread computations. Due to the chip rate being 1 ns (=1/1 GHz), it takes 128 ns to perform the despread computations. This corresponds to 16 baseband clocks.

Figure 10:
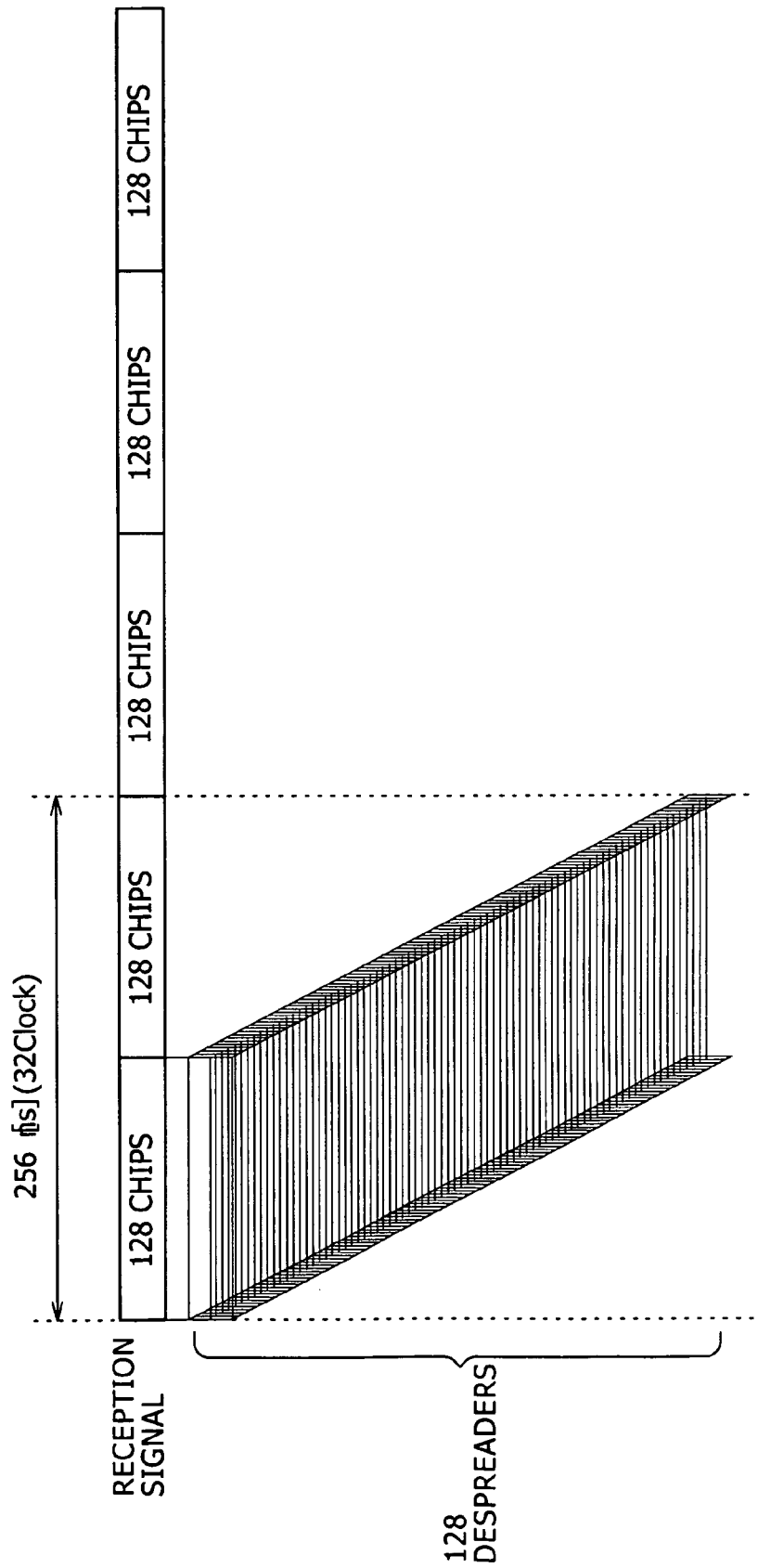
FIG. 10 shows an image in which each of the 128 despreaders is shifted by 1 chip and 128 despread computations at respective points are processed concurrently.

In such a case, from the viewpoint of speed enhancement, it is ideal to implement 128 despreaders in the propagation measurement section and operate the despreaders concurrently. That is, each of the 128 despreaders is shifted by 1 chip, and 128 despread computations at respective points are processed concurrently. FIG. 10 illustrates this processing. It takes 128 ns from the start of the despread computation of the first point to the start of the despread computation of the 128th point and a despread computation per point requires 128 ns, so that it takes 256 ns to measure 128 points shown in FIG. 10.

However, it is disadvantageous in terms of circuit scale and circuit power consumption to implement the 128 despreaders corresponding to the number of chips of the spread short code in the propagation measurement section.

The inventors of the present invention, in consideration of a trade-off between speed enhancement and circuit scale and power consumption, arrange in parallel a smaller number of despreaders than the number of chips of the spread short code and allow the propagation measurement section to use the despreaders several times in a time-division manner and perform despread computations on all chips.

Figure 11:
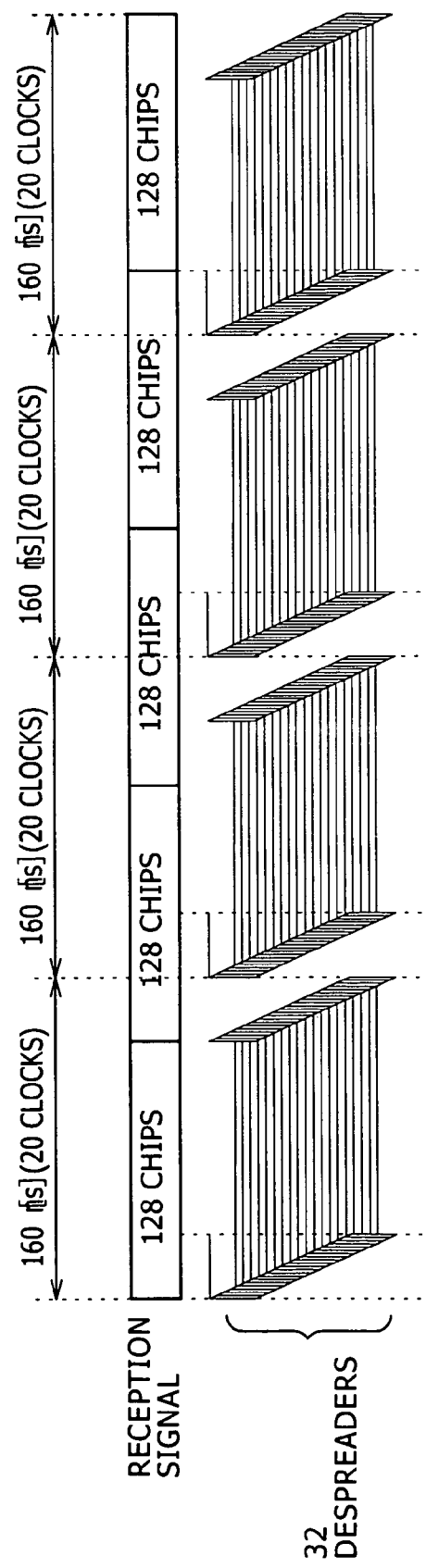
FIG. 11 shows an image in which 32 despreaders corresponding to one quarter of the number of chips of the spread short code 128 are arranged in parallel and used four times in a time-division manner, thereby measuring 128 points (=32 despreaders×4 times).

For example, an integral submultiple of the number of chips of the spread short code, specifically 32 despreaders which correspond to one quarter are arranged in parallel and used four times in a time-division manner, thereby measuring 128 points (=32 despreaders×4 times). FIG. 11 illustrates this processing.

In this case, since it takes 32 ns from the start of the despread computation of the first point to the start of the despread computation of the 32nd point and a despread operation per point requires 128 ns, a despread computation per time takes 160 (=32+128) ns. This is repeated four times in a time-division manner, so that it takes 640 ns (=160 ns×4 times) to measure 128 points shown in FIG. 11.

Figure 12:
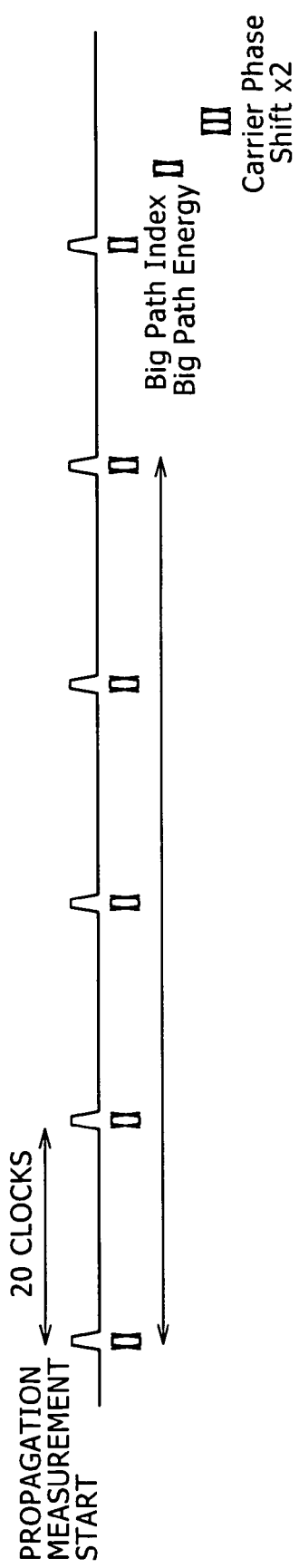
FIG. 12 is an illustration showing an operation sequence in which a physical layer sequence control section controls propagation measurement of a propagation measurement section.

As shown in FIG. 11, in the case of arranging 32 despreaders in parallel and dividing 128 chips into 4 blocks to perform propagation measurement in a time-division manner, the physical layer sequence control section informs the propagation measurement section of a measurement start trigger of each block and positions of measurement points, thereby achieving this operation. FIG. 12 shows an operation sequence in which the physical layer sequence control section controls propagation measurement of the propagation measurement section.

As described above, it takes 640 ns (=160 ns×4 times) to complete measurement of 128 points of the spread short code corresponding to in-chip phase 0/4. In response to this, the physical layer sequence control section outputs, to the RF section, a control signal PhaseShift for shifting an AD sampling phase by 180 degrees to shift the in-chip phase by 2/4. Subsequently, the propagation measurement section starts propagation measurement of 128 points corresponding to in-chip phase 2/4. The amount of shift is 0.5 ns which is equivalent to half the chip rate.

The propagation measurements of 128 points at in-chip phase 2/4 are performed in the same way as in in-chip phase 0/4. That is, 32 despreaders are used four times in a time-division manner, thereby measuring 128 points (=32 despreaders×4 times) (see FIG. 11). It takes 640 ns (=160 ns×4 times) to measure 128 points.

At this point in time, the propagation measurement section has completed the first measurement at points 0/4 and 2/4 of the in-chip phases. As a result of this, a measurement has been performed on 128-ns period with a sampling period of 0.5 ns corresponding to half the chip rate (equivalent to double over-sampling). This measurement takes 1.28 μs (=640 ns×2 times).

Figure 13:
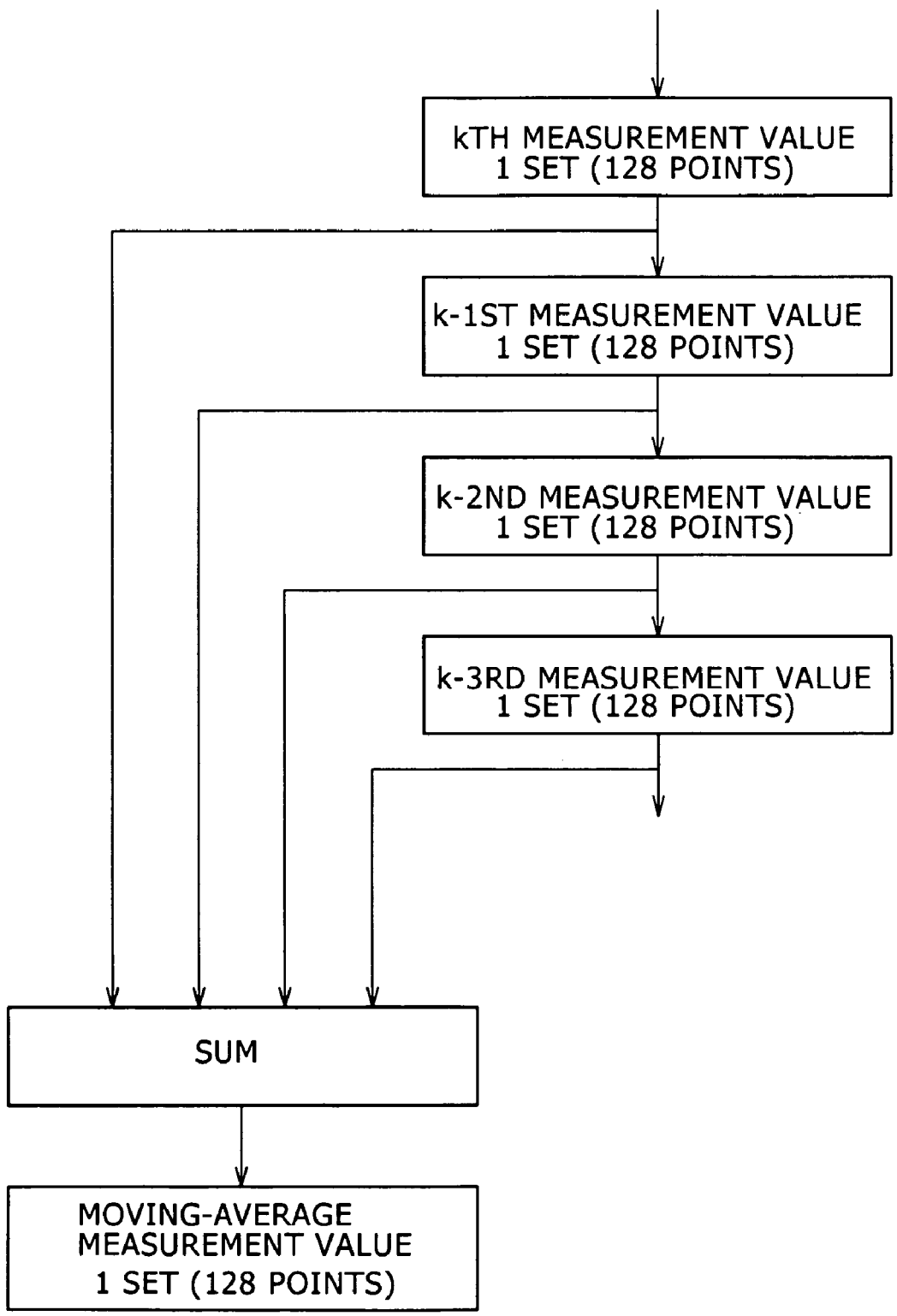
FIG. 13 is an illustration for explaining a measurement sequence obtaining the moving average of measurement results.

From this point forward, the propagation measurement section repeats the same measurement and obtains the moving average of the measurement results, thereby improving the S/N ratio of the measurement values. FIG. 13 schematically shows the measurement sequence in this case. At in-chip phases 0/4 or 2/4, the propagation measurement section repeats propagation measurement of a set of 128 points and stores the measurement result of each set in a memory. Further, the propagation measurement section reads out the (k-3) th to kth measurement results from the memory and obtains the moving average of the measurement results, thereby improving the S/N ratio.

After that, the physical layer sequence control section interpolates the complex amplitude values at points shifted by +1/4 from the measured points, namely, at points 1/4 and 3/4 of the in-chip phases. The use of the interpolated values can improve the accuracy of preamble end detection in comparison with using only the measurement values at points 0/4 and 2/4 of the in-chip phases. Since the method of the interpolation is the same as described, the description thereof is omitted here.

Figure 14:
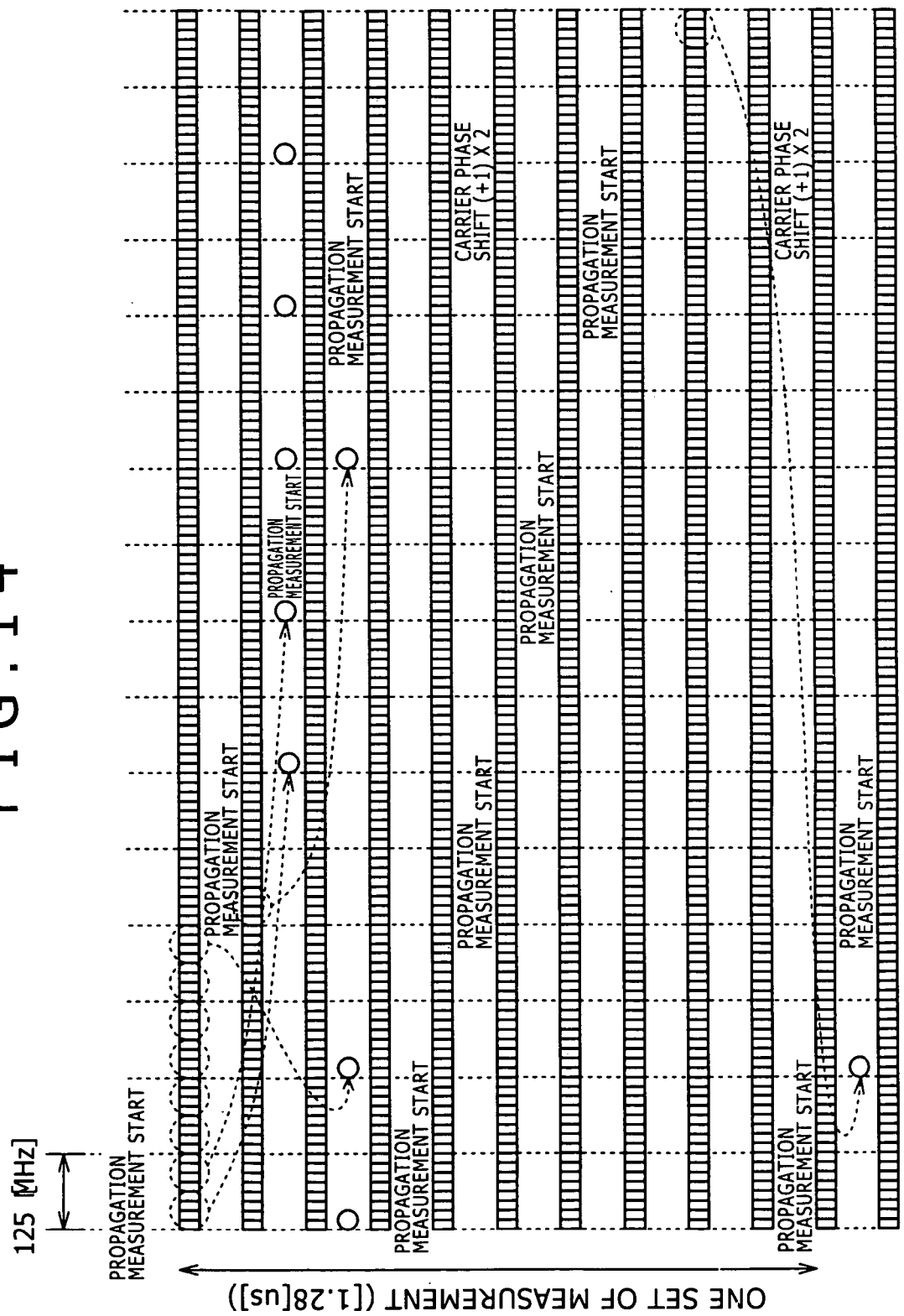
FIG. 14 is an illustration for explaining a propagation measurement sequence.

FIG. 14 illustrates a propagation measurement sequence in this case. As shown in FIG. 14, a spread short code consisting of 128 chips is divided into each 32 bit in a time-division manner, and a measurement of 128 points is completed with 4 measurement operations. Such measurements are performed at in-chip phases 0/4 and 2/4, and as a whole, a set of measurements is completed with a required time of 1.28 μs.

E. Circuit Configuration of the Propagation Measurement Section

As described until the preceding article D, since the propagation measurement section according to the embodiment of the present invention employs the integral submultiple of the chip rate as the clock frequency to the baseband section, the propagation measurement section despreads each short code to perform propagation measurement. In consideration of a trade-off between speed enhancement and circuit scale and power consumption, 32 despreaders which correspond to one quarter are arranged in parallel and used four times in a time-division manner, thereby measuring 128 points (=32 despreaders×4 times).

Figure 15:
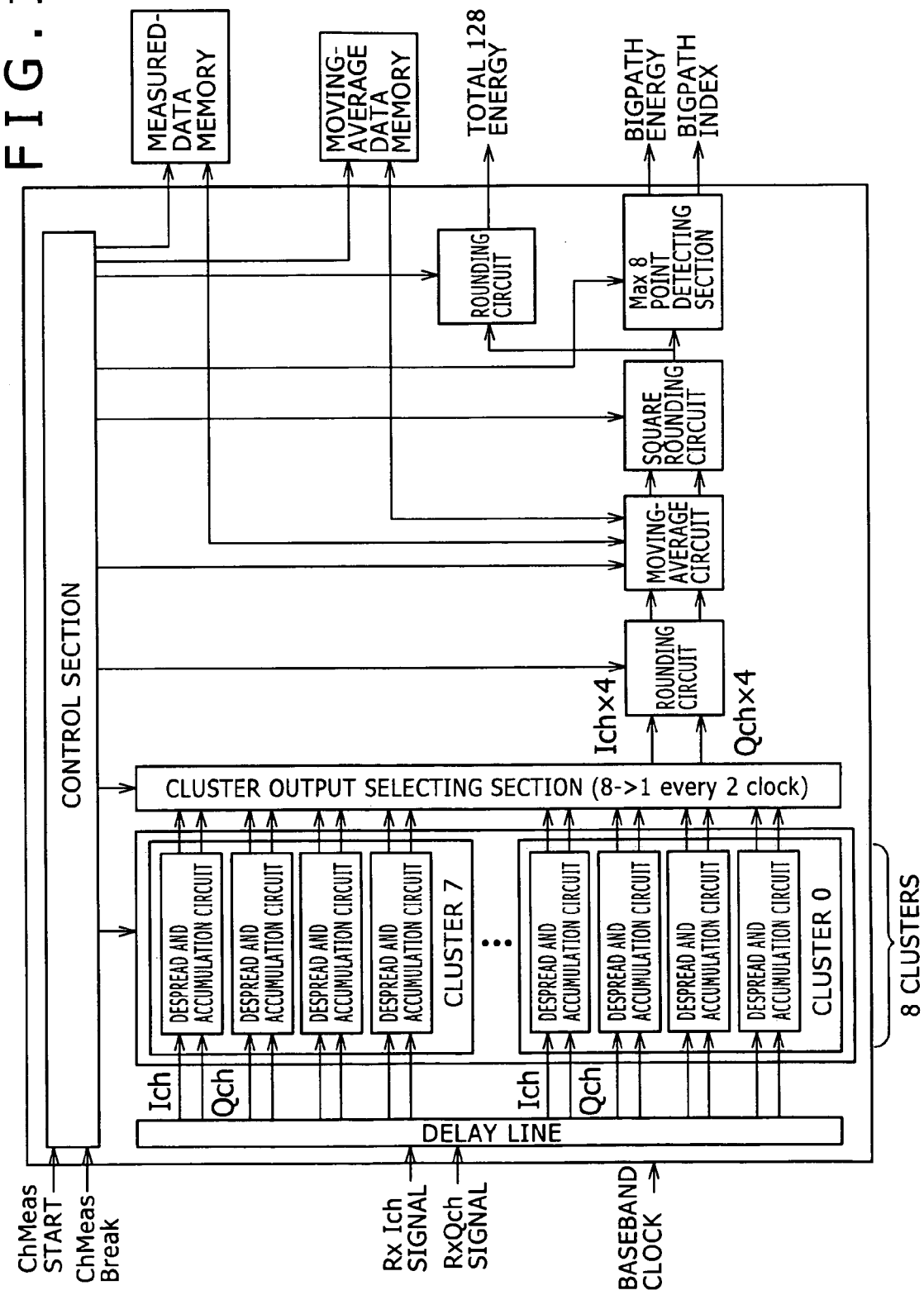
FIG. 15 is an illustration showing the circuit configuration of a propagation measurement section.

FIG. 15 shows the circuit configuration of the propagation measurement section. As shown in FIG. 15, the propagation measurement section includes a delay line circuit for buffering parallel reception signals from the RF circuit and converting into serial data in chronological order, 32 despread circuits and accumulation circuits that are separated into 8 groups of 4, a selector circuit for selecting outputs of the 8 groups of despreaders and accumulators, a rounding circuit for rounding the selected output values of the despreaders and accumulators, a moving-average circuit for performing moving-average computations and a memory for storing values before and after this computation, an energy calculation circuit for calculating energy levels of reception signals, a path detection circuit for sorting the energy levels and outputting the sorted energy levels along with position information thereof, and a control circuit for controlling these circuits.

In the circuit configuration shown in FIG. 15, 32 despread circuits and accumulation circuits are separated into 8 groups of 4. The group is hereinafter referred to a "Cluster".

The internal operation of the propagation measurement section will be hereinafter described in detail with reference to FIG. 15.

In the RF section, a received signal is sampled by A/D conversion at a 1-GHz sample rate. A serial-parallel converter converts the sampled I-axis and Q-axis signals into parallel signals of 8 samples each, which are passed to the baseband section.

In the baseband section, the delay line circuit converts I-axis components and Q-axis components of 8-parallel reception signals into serial signals of 104 samples respectively, from which there is obtained 4 parallel signals of 8 samples each at 4 timings every 12 samples.

Figure 16:
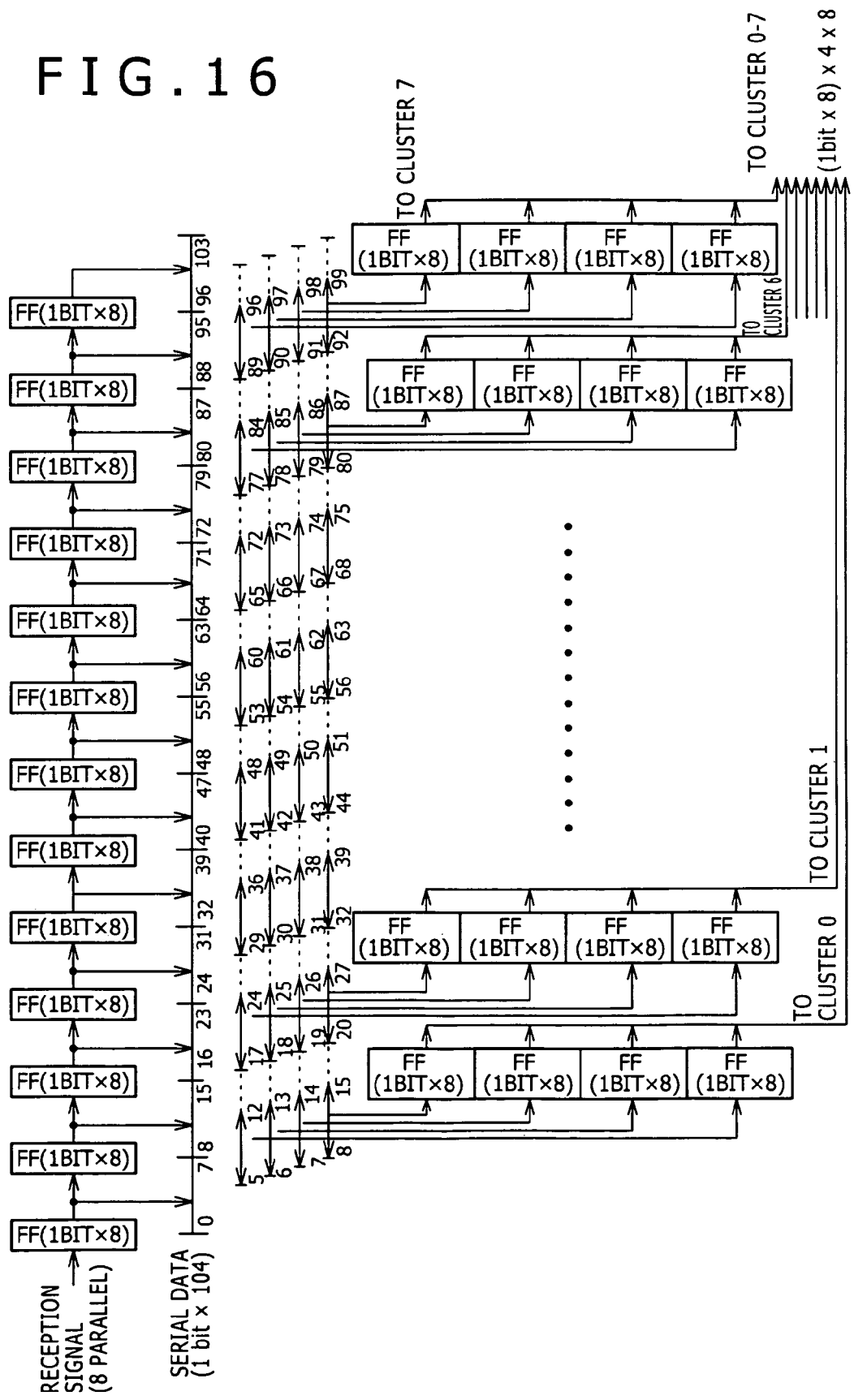
FIG. 16 is an illustration showing the internal configuration of a delay line circuit.

FIG. 16 shows the internal configuration of the delay line circuit. The above operation will be described more specifically with reference to FIG. 16. Among the serial data, the following data is selected as input to cluster 0. These are inputs to 4 despreaders in cluster 0.

*8 samples of 5-12,*8 samples of 6-13,*8 samples of 7-14, *8 samples of 8-15

Further, the inputs to cluster 1 start at positions 12 samples away from the inputs to cluster 0, the following data is selected.

*8 samples of 17-24,*8 samples of 18-25,*8 samples of 19-26,*8 samples of 20-27

From this point forward, in the same way, input to each cluster from serial data is selected every 12 samples.

Figure 17:
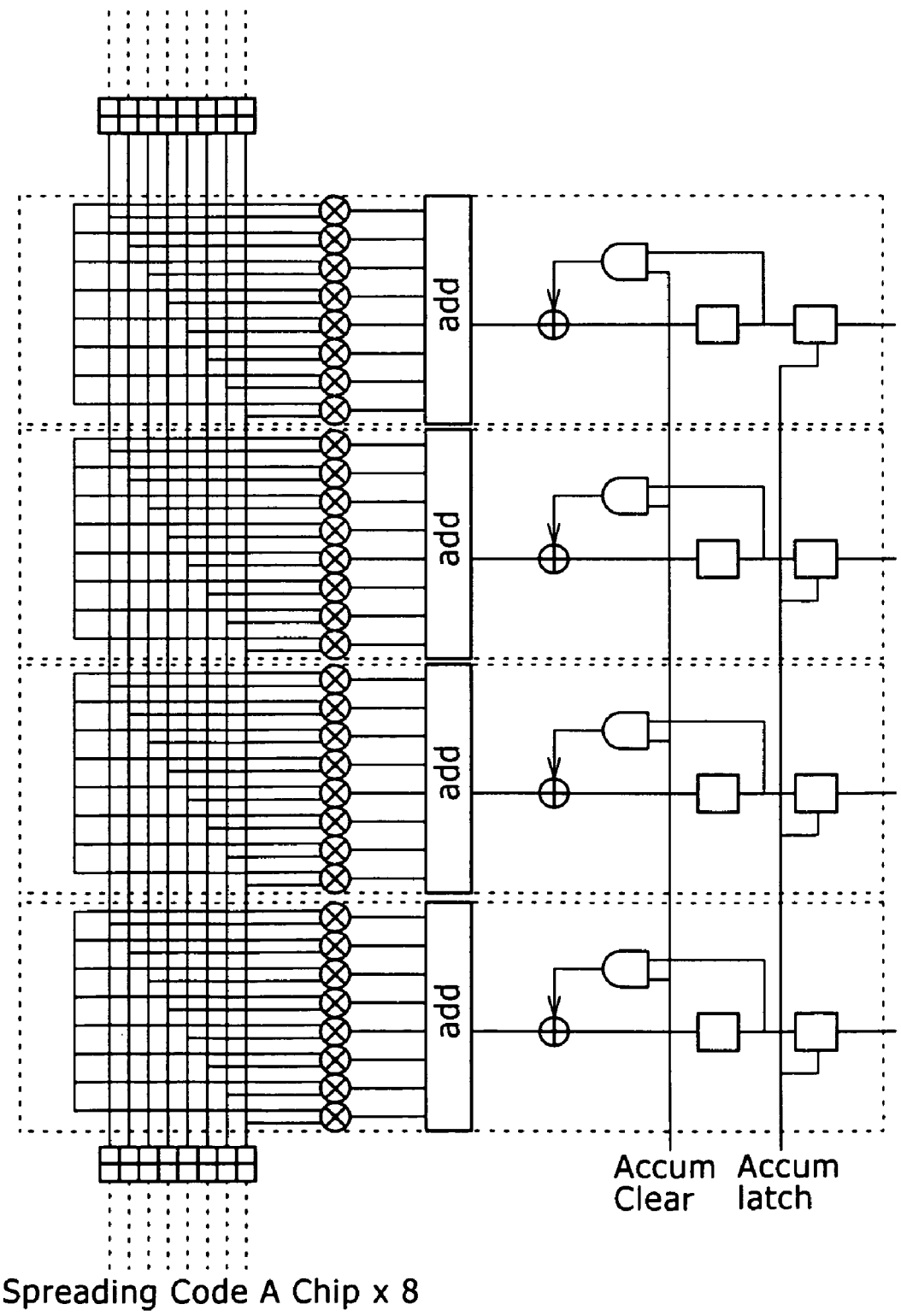
FIG. 17 is an illustration showing the internal configuration of a despreader and an accumulator.

Next, a description will be made on the despreader and accumulator (Despreader/Accumulator), with reference to FIG. 17. As described above, 32 despreaders and accumulators are separated into 8 groups of 4. The group is referred to "Cluster". With this configuration, propagation measurement for 32 points is measured as 4 points×8 clusters.

The despreader performs despread computations for 8 chips per baseband clock. That is, despread computations that one despread circuit performs per clock are equal to the parallel number of input signals.

The accumulator accumulates the computation values. Performing this accumulation 16 times (16 clocks) brings about despread of 1/128.

The above process is performed concurrently at each of the 4 despreaders and accumulators in one cluster. That is, from one cluster, 1/128 despread computation results for 4 points are prepared every 16 clocks.

Eight clusters are controlled such that each of them operates with 2 clocks shifted. With this, respective clusters output computation results every 2 clocks in turn.

Figure 18:
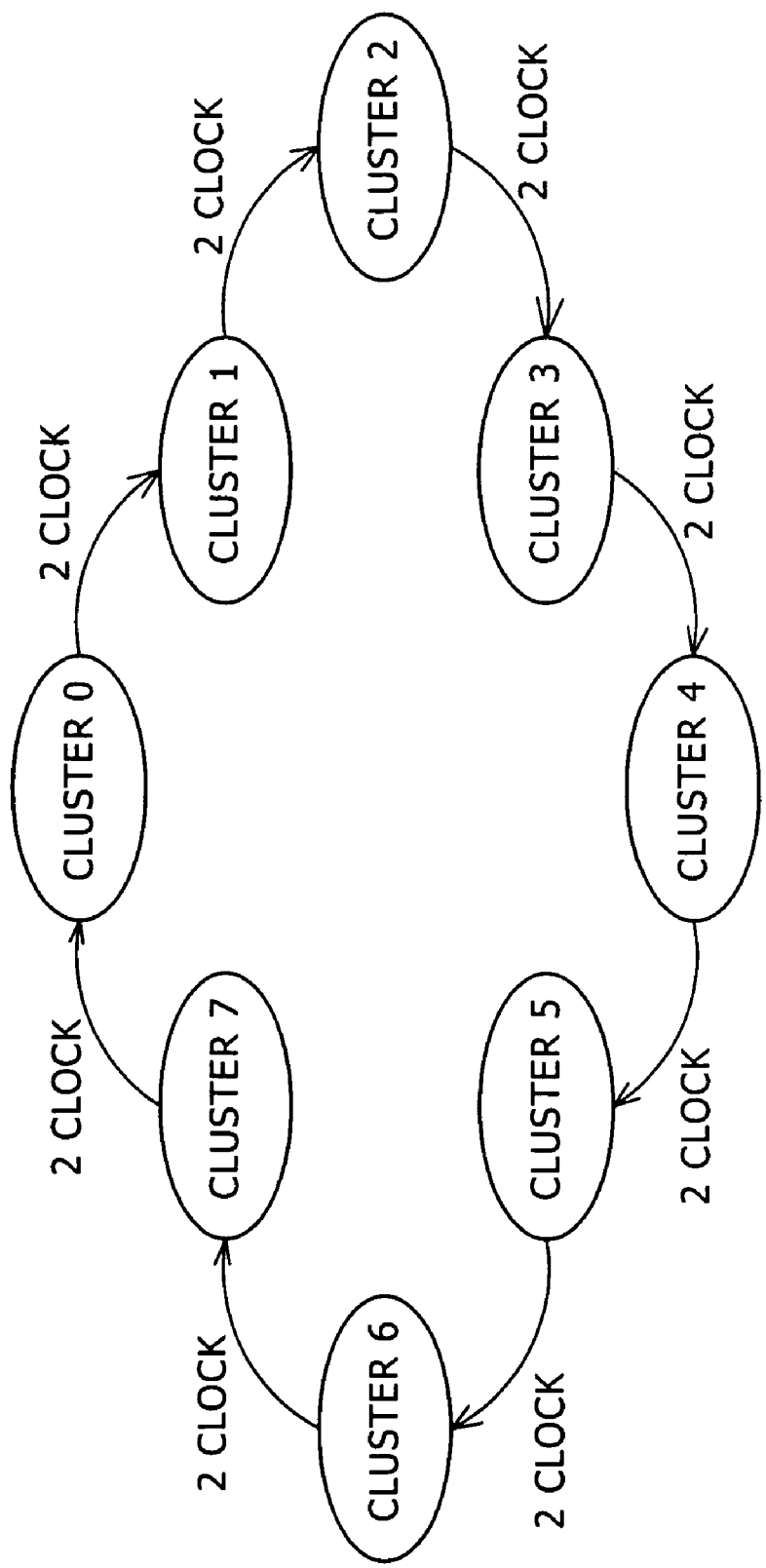
FIG. 18 shows an image of the control sequence of a selector circuit.

Outputs from the respective clusters are selected every 2 clocks by the selector circuit (Cluster Output Selector) in turn. FIG. 18 shows an image of the control sequence of the selector circuit.

That is, the computation results from the respective clusters are selected and outputted for just a 16-clock period. Assuming that the number of chips of a short code for propagation measurement is A and the number of chips (input bit width) of despread and accumulation computations that the despread section performs per clock is B, the control period (16 clocks) is selected so as to be the relation of A÷B [clocks]. In this embodiment, the number of chips of a short code is 128 chips and the despreader performs despread computations for 8 chips per baseband clock; therefore, A÷B=128÷8=16.

The above-described configuration enables effective propagation measurement computations with the small number of circuit components.

Figure 19:
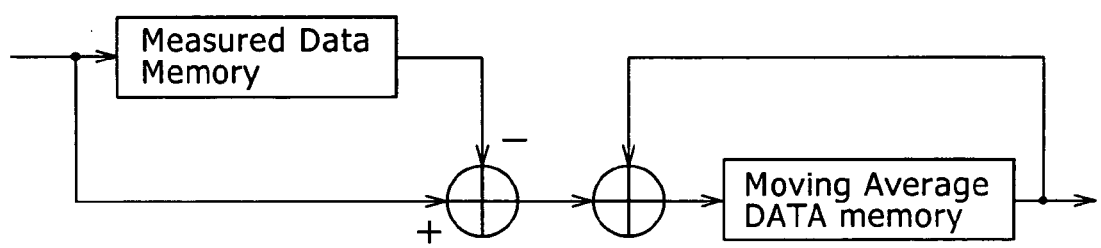
FIG. 19 shows an image of the configuration of a moving-average circuit.
Figure 20:
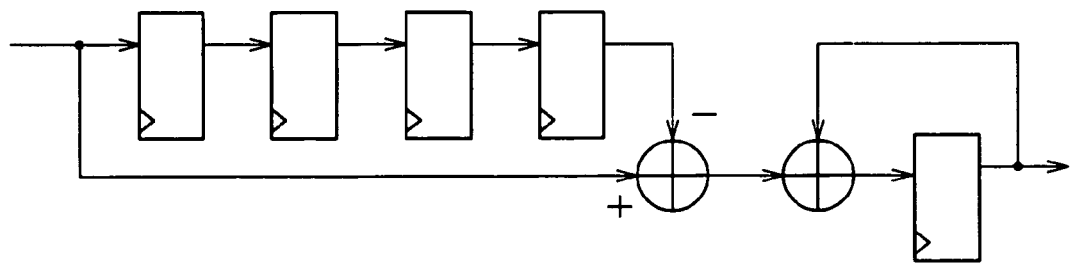
FIG. 20 is an illustration showing the configuration of an equivalent circuit of the moving-average circuit shown in FIG. 19.

The computation result (propagation measurement result) selected by the selector circuit is rounded by the rounding circuit (RoundLimit) and is subject to moving-average processing for improving the S/N ratio. In the configuration shown in FIG. 15, four moving averages are performed. It is configured as shown in FIG. 19 using memories, and equivalent processing as shown in the following equation and FIG. 20 are performed at the same measurement point.

$$MA(z) = \frac{1 - z^{-4}}{1 - z^{-1}} = 1 + z^{-1} + z^{-2} + z^{-3} \quad (2)$$

In memories, with consideration given to a 125 MHz cycle, there are employed a plurality of parallel data and 4 points× I/Q as one word. FIG. 21 shows a configuration example of a memory map for storing propagation measurement data.

Figures 22, 23:
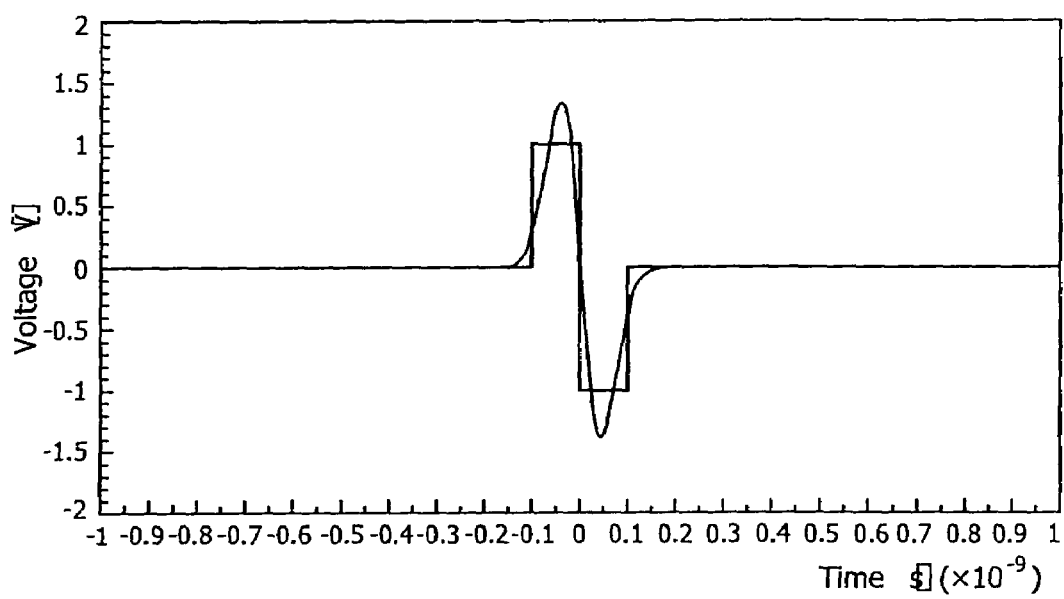
FIG. 22 is an illustration showing a configuration example of a memory map for storing moving average data.
FIG. 23 is an illustration showing a time waveform of a Gaussian monocycle pulse.
Figure 24:
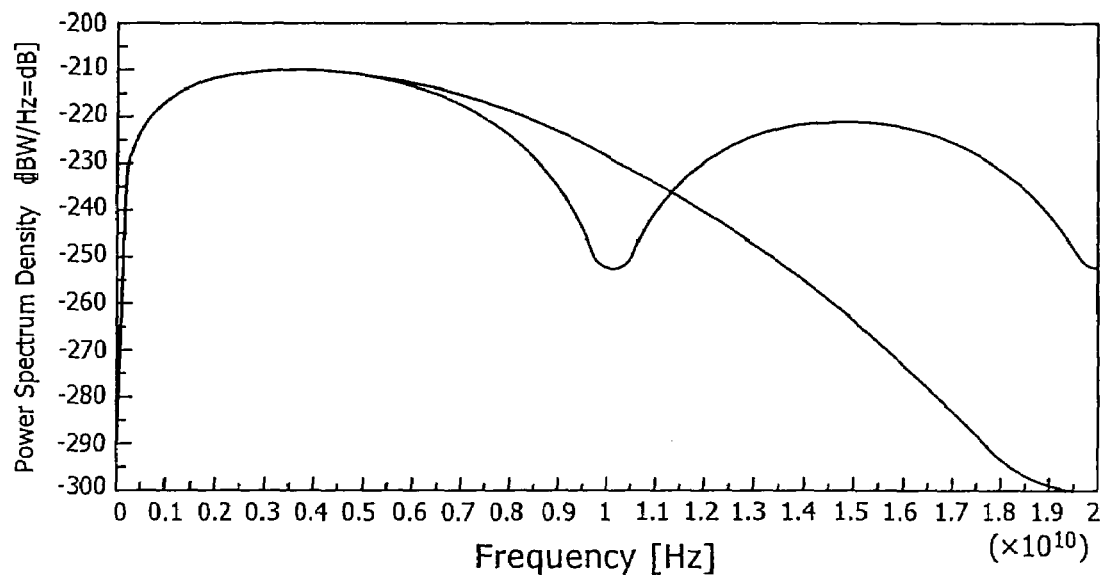
FIG. 24 is an illustration showing frequency characteristics of power spectrum densities for a Gaussian and a rectangular monocycle pulses.
Figure 25:
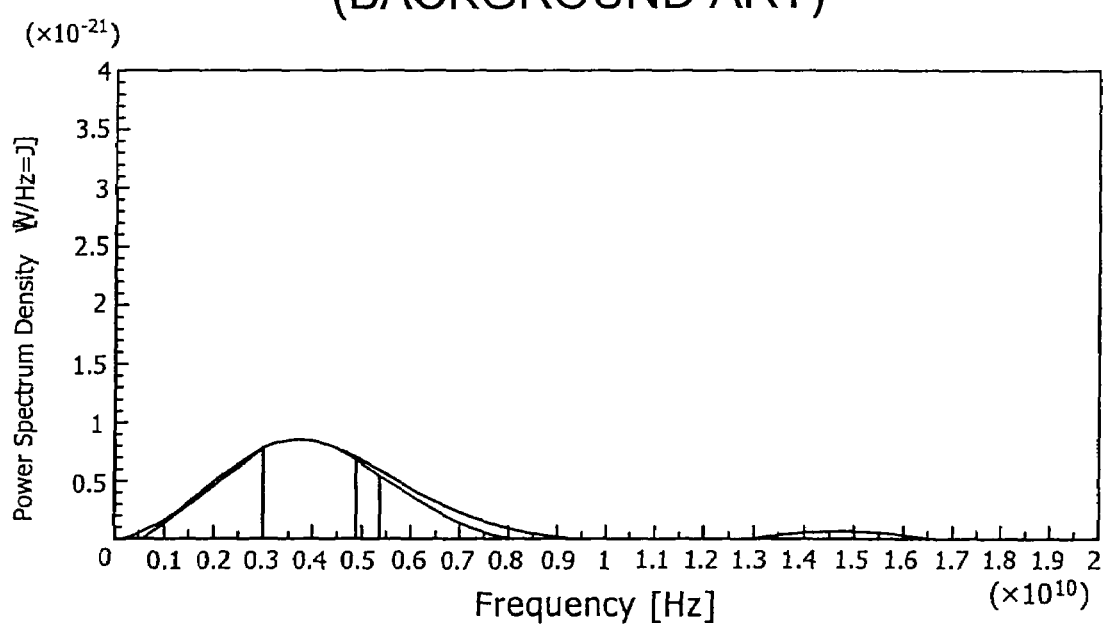
FIG. 25 is an illustration showing frequency characteristics of power spectrum densities for a Gaussian and a rectangular monocycle pulses.
Figure 26:
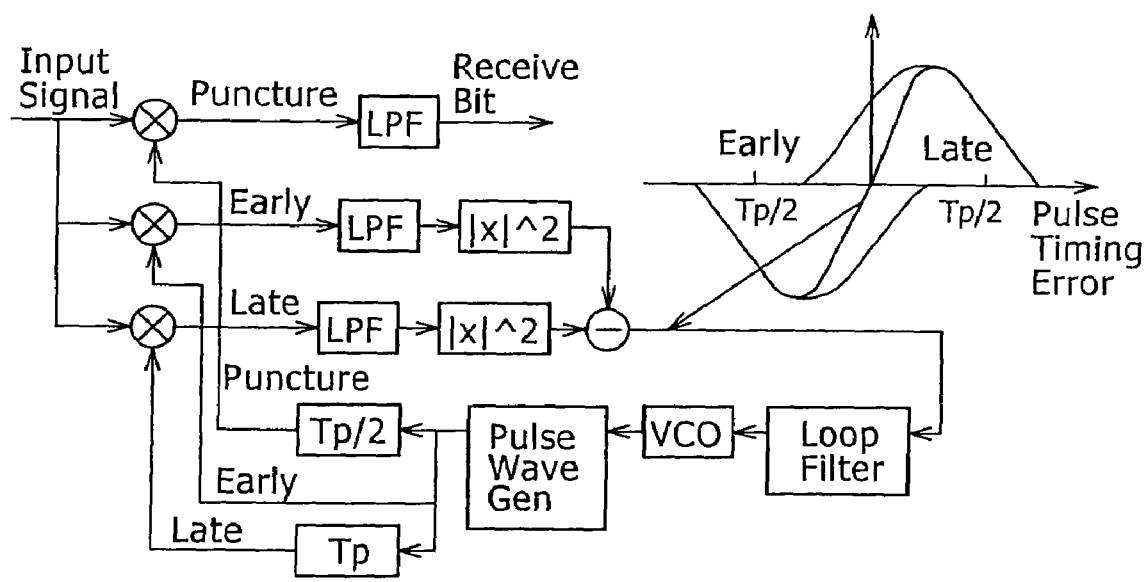
FIG. 26 is an illustration showing a configuration example (conventional example) of a receiver in an ultra-wideband communication system.

Further, FIG. 22 shows a configuration example of a memory map for storing moving average data. The propagation measurement section concurrently calculates moving averages and energy values of measurement data in the respective cases of in-chip phases 0/4 and 2/4, and finds the largest energy values at 8 points out of 128 points and their points (Index). After the completion of detection of the largest values out of 128 points in the respective cases of in-chip phases 0/4 and 2/4, the result is passed to the physical layer sequence control section.

The physical layer sequence control section performs signal detection using this information. If signal detection is completed, the propagation measurement section stops operating.

The present invention has been described in detail with reference to a specific embodiment. It is further understood by those skilled in the art that various changes and modifications may be made in the embodiments without departing from the spirit and scope thereof.

This specification has described a primary embodiment of the invention in the case of applying spectrum spread and ultra-wideband communication. However, the spirit and scope of the invention is not limited to this. It is needless to say that a communication system for performing regular spectrum spread can achieve the present invention in the same manner.

That is, the present invention has been disclosed in the form of exemplification. The contents of the specification should not be interpreted restrictively. To understand the gist of the present invention, the appended claims should be taken into consideration.

What is claimed is:

1. A wireless code-spread transmission receiver, comprising:
    an RF section; and
    a baseband section, including
        a plurality of despreaders corresponding, in number, to an integral submultiple, $1/n_1$, of a number of chips in a spread code, the plurality of despreaders being arranged in parallel and separated into a plurality of despreader groups, each despreader group having at least two despreaders, each despreader performing a number of despread computations per clock equal to a parallel number of input signals, each despreader group being offset from other despreader groups by two clock cycles,
        a propagation measurement section configured to measure a propagation channel using the plurality of despreaders a plurality of times in a time-division manner and configured to despread each period according to a chip rate of the spread code.

2. The wireless code-spread transmission receiver according to claim 1, wherein the baseband section has a clock frequency of an integral submultiple, $1/_2$, of chip rates in the RF section.

3. The wireless code-spread transmission receiver according to claim 1, wherein the propagation measurement section includes:
    a delay line circuit configured to buffer parallel reception signals from the RF section and converts the buffered parallel reception signals into serial data in chronological order,
    a plurality of accumulation circuits separated into a plurality of groups corresponding to the plurality of despreader groups,
    a selector circuit configured to select outputs of each group of despreaders and accumulators,
    a moving-average circuit configured to perform a moving-average computation on propagation measurement results of the despread circuits and accumulation circuits,
    a memory circuit configured to store values before and after a computation by the moving-average circuit,
    an energy calculation circuit configured to calculate an energy level of a reception signal, and
    a path detection circuit configured to sort an energy value of each receiving position and outputs the energy value along with position information thereof.

4. The wireless code-spread transmission receiver according to claim 3, wherein the propagation measurement section further includes a rounding circuit configured to round selected output values of the despreaders and accumulators.

5. The wireless code-spread transmission receiver according to claim 3, wherein the propagation measurement section adopts, as a propagation measurement value, a value obtained by despreading reception signal sampled at a chip timing of A/D conversion in the RF section using a short code for propagation measurement.

6. The wireless code-spread transmission receiver according to claim 3, further comprising a reception control section configured to control sampling timing of A/D conversion in the RF section.

7. The wireless code-spread transmission receiver according to claim 3, further comprising:
    a preamble end detection section configured to detect an end of a preamble signal; and
    a RAKE combining section configured to RAKE-combine energy of a multipath signal and demodulates a signal.

8. The wireless code-spread transmission receiver according to claim 7, wherein the propagation measurement section and the preamble end section measure propagation and detect a preamble end according to a plurality of spread short codes having good autocorrelation properties, the spread short codes being included in a periodic training section of a preamble section of the reception signal.

9. The wireless code-spread transmission receiver according to claim 8, wherein an AGC is stabilized according to the preamble section having a symbol period spread by using any of the plurality of short codes.

10. The wireless code-spread transmission receiver according to claim 3, wherein parallel input signals to each of the despread circuits are captured at intervals according to a plurality of taps in the delay line circuit.

11. The wireless code-spread transmission receiver according to claim 3, wherein the plurality of despread circuits and accumulation circuits employ an appropriate despread timing respectively.

12. The wireless code-spread transmission receiver according to claim 3, wherein the plurality of despread circuits and accumulation circuits, that are separated into a number of groups, employ an appropriate despread timing respectively.

13. The wireless code-spread transmission receiver according to claim 12, wherein if the number of chips of a short code for propagation measurement is A and the number of chips of despread and accumulation computations that the despread circuits and accumulation circuits perform per clock is B, despread timing is calculated according to a control period of A÷B clocks.

14. The wireless code-spread transmission receiver according to claim 3, wherein the propagation measurement section determines that a location where the largest energy is found out of propagation measurement values is a symbol/pulse position and performs a despread computation by a short code for preamble end detection at the symbol/pulse position.

15. The wireless code-spread transmission receiver according to claim 3, wherein the propagation measurement section removes an effect of a symbol pattern of a training section from a measured value by correlating a plurality of paths detected by the path detection circuit with symbol patterns respectively and further performs interpolation, thereby determining a final propagation measurement value.

16. The wireless code-spread transmission receiver according to claim 15, wherein in the interpolation, assuming that an amplitude value of a detected path is $M_{max}$ and values at positions before and after a detected position are $M_{-2/4}$ and $M_{+2/4}$ respectively, interpolated values $I_1$ and $I_2$ are obtained by the following equations:

$$I_1 = a/b \times (M_{-2/4} + M_{max})$$

$$I_2 = a/b \times (M_{max} + M_{+2/4}).$$

17. A method for causing a wireless code-spread transmission received to receive a wireless code-spread transmission, the method comprising:
receiving, in an RF section, a code-spread transmission signal;
simultaneously despreading an integral submultiple number of a number of chips of a spread code by causing each of a plurality of despreaders to perform a number of despread computations per clock equal to a parallel number of input signals, the plurality of despreaders being separated into groups offset by two clock cycles, each despreader group having at least two despreaders, the despreading of each period corresponding to a chip rate of the spread code; and
repeating the simultaneously despreading step a plurality of times in a time-division manner, in baseband processing.

18. A code-spread reception signal propagation measurement apparatus, comprising:
despreaders arranged in parallel, the number of despreaders being an integral submultiple, $1/n_1$, of the number of chips of a spread code, the despreaders being separated into a plurality of despreader groups offset by two clock cycles, each despreader group having at least two despreaders, each despreader performing a number of despread computations per clock equal to a parallel number of input signals;
wherein a propagation channel is measured by using the despreaders a plurality of times in a time-division manner, thereby performing despread of each period corresponding to a chip rate of the spread code.

19. The code-spread reception signal propagation measurement apparatus according to claim 18, wherein the propagation measurement apparatus is incorporated in a baseband section in a receiver having an RF section and the baseband section, and the baseband section has a clock frequency of an integral submultiple, which is $1/n_2$, of chip rates in the RF section.

20. The code-spread reception signal propagation measurement apparatus according to claim 18, comprising:
a delay line circuit configured to buffer parallel reception signals from the RF section and configured to convert the buffered parallel reception signals into serial data in chronological order,
a plurality of accumulation circuits separated into a number of groups corresponding to the despreader groups,
a selector circuit configured to select outputs of each group of despreaders and accumulators,
a moving-average circuit configured to perform a moving-average computation on propagation measurement results of the despread circuits and accumulation circuits,
a memory circuit configured to store values before and after a computation by the moving-average circuit,
an energy calculation circuit configured to calculate an energy level of a reception signal, and
a path detection circuit configured to sort an energy value of each receiving position and outputs the energy value along with position information thereof.

21. The code-spread reception signal propagation measurement apparatus according to claim 20, further comprising a rounding circuit configured to round selected output values of the despreaders and accumulators.

22. The code-spread reception signal propagation measurement apparatus according to claim 20, wherein a value obtained by despreading reception signal sampled at chip timing of A/D conversion in the RF section using a short code for propagation measurement is adopted as a propagation measurement value.

23. The code-spread reception signal propagation measurement apparatus according to claim 18, wherein the propagation measurement section and the preamble end section measure propagation and detect a preamble end according to a plurality of spread short codes having good autocorrelation properties, the spread short codes being included in a periodic training section of a preamble section of the reception signal.

24. The code-spread reception signal propagation measurement apparatus according to claim 20, wherein parallel input signals to each of the despread circuits are captured at predetermined intervals from a plurality of taps in the delay line circuit.

25. The code-spread reception signal propagation measurement apparatus according to claim 20, wherein the plurality of despread circuits and accumulation circuits are given appropriate despread timing respectively.

26. The code-spread reception signal propagation measurement apparatus according to claim 20, wherein the plurality of despread circuits and accumulation circuits that are separated into a number of groups are given appropriate despread timing respectively.

27. The code-spread reception signal propagation measurement apparatus according to claim 26, wherein when the number of chips of a short code for propagation measurement is A and the number of chips of despread and accumulation computations that the despread circuits and accumulation circuits perform per clock is B, despread timing causing a control period to become a relation of A÷B clocks.

28. A method of causing a code-spread reception signal propagation measurement apparatus to perform a code-spread reception signal propagation measurement, the method comprising:

measuring a propagation channel by despreading an integral submultiple number of a number of chips of a spread code using a plurality of despreaders arranged in parallel and separated into despreader groups, each despreader group having at least two despreaders, each of the despreaders performing a number of despread computations per clock equal to a parallel number of input signals, each despreader group being offset by two clock cycles with respect to other despreader groups; and repeating the measuring step a plurality of times in a time-division manner, a number of despread computations per clock being equal to a parallel number of input signals, and despreading each period corresponding to a chip rate of the spread code.

* * * * *